(12) United States Patent
Kota et al.

(10) Patent No.: US 7,469,156 B2
(45) Date of Patent: Dec. 23, 2008

(54) PORTABLE INFORMATION TERMINAL

(75) Inventors: Yuichiro Kota, Tokyo (JP); Minoru Ikeda, Inagi (JP)

(73) Assignee: Hitachi, Ltd., Tokyo (JP)

( * ) Notice: Subject to any disclaimer, the term of this patent is extended or adjusted under 35 U.S.C. 154(b) by 922 days.

(21) Appl. No.: 10/786,392

(22) Filed: Feb. 26, 2004

(65) Prior Publication Data

US 2005/0052837 A1   Mar. 10, 2005

(30) Foreign Application Priority Data

Sep. 9, 2003   (JP)   ............................. 2003-316187

(51) Int. Cl.
*H04M 1/00*   (2006.01)
(52) U.S. Cl. .................. 455/575.4; 455/556.1
(58) Field of Classification Search .............. 455/575.1, 455/575.3, 575.4, 575.8, 550.1, 90.3, 556.1, 455/556.2; 361/814
See application file for complete search history.

(56) References Cited

U.S. PATENT DOCUMENTS 6,128,475 A * 10/2000 Wicks et al. ............. 455/575.4
7,076,058 B2 * 7/2006 Ikeuchi et al. .......... 379/433.12
2004/0204202 A1 * 10/2004 Shimamura et al. ...... 455/575.1

FOREIGN PATENT DOCUMENTS

| CN | 1416256 A | 10/2002 |
|---|---|---|
| JP | 2002-111835 | 10/2000 |
| JP | 2003-32335 | 7/2001 |
| JP | 2003-110675 | 9/2001 |
| JP | 2003-179678 | 7/2002 |

* cited by examiner

*Primary Examiner*—Lewis West
(74) *Attorney, Agent, or Firm*—Reed Smith LLP; Stanley P. Fisher, Esq.; Juan Carlos A. Marquez, Esq.

(57) ABSTRACT

An objective of the present invention is to provide a slide type portable information terminal having a favorable internal packaging efficiency and a compact shape. A first body and a second body, each having a wedge shaped outer appearance, where a dimension in the depth direction gradually becomes thinner from one side to the other side in the width direction, are slidably coupled via a slide mechanism to constitute a body. As for the body, when the first body and the second body are overlapped, a part of the second body having the thickest dimension in the depth direction is arranged on one side of the front surface of the first body, as well as a part of the first body having the thickest dimension in the depth direction is arranged on one side of the rear of the second body, and a camera unit is arranged in the portion with thickest dimension in the depth direction of the first body.

8 Claims, 17 Drawing Sheets

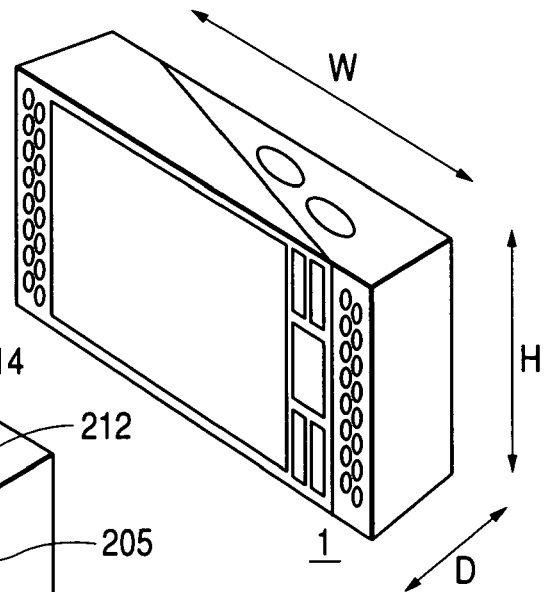
FIG. 1A
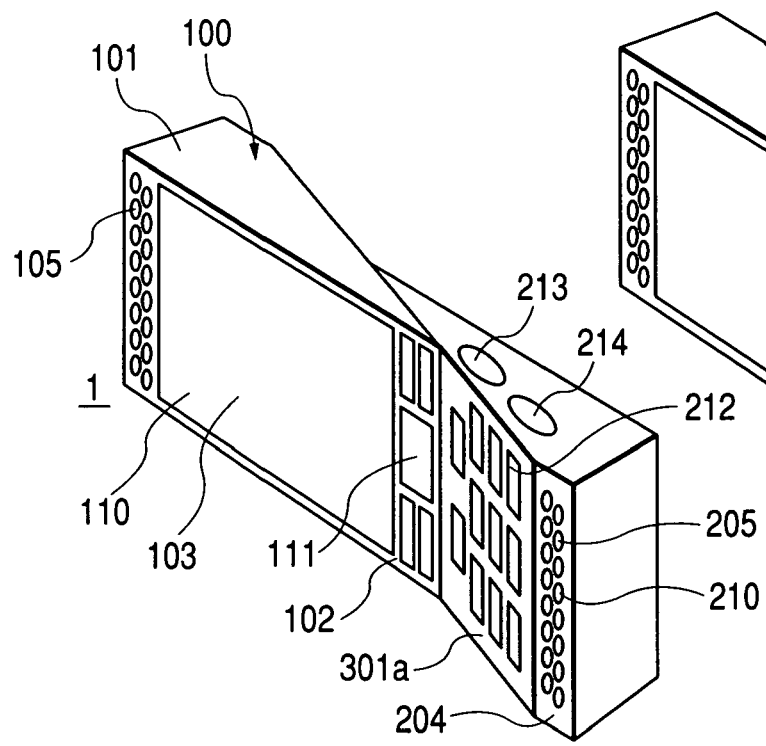
FIG. 1C
FIG. 1B
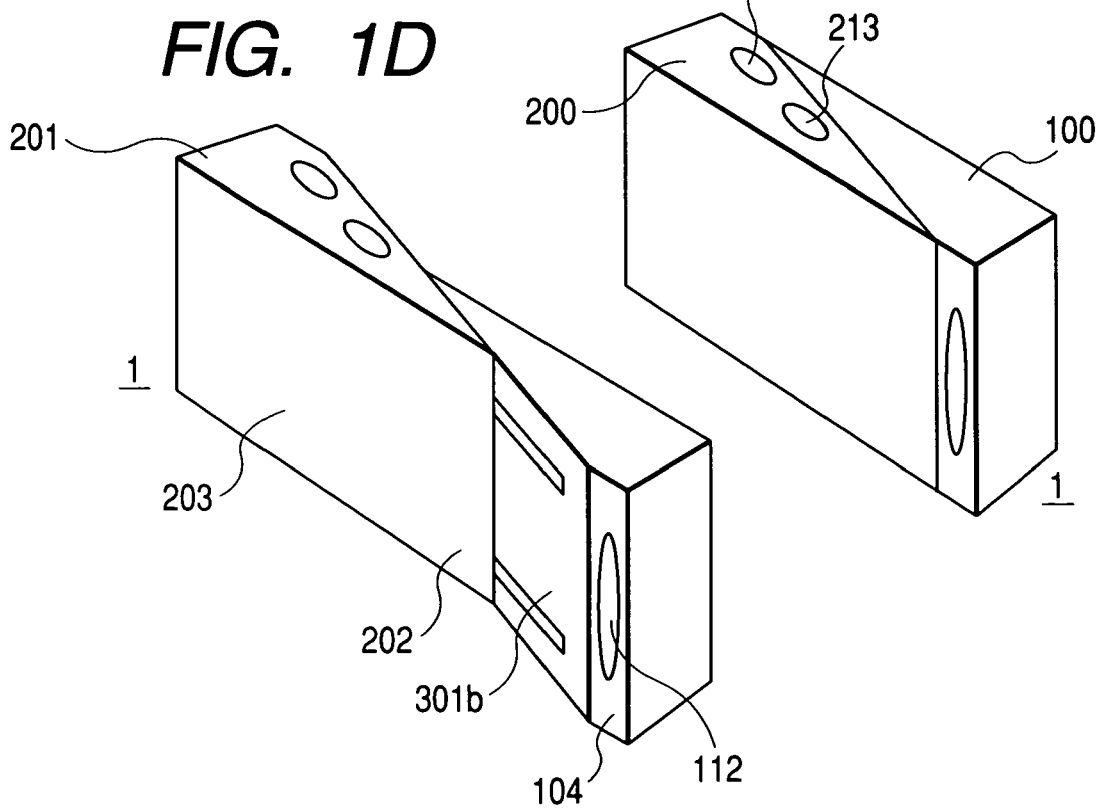
FIG. 1D

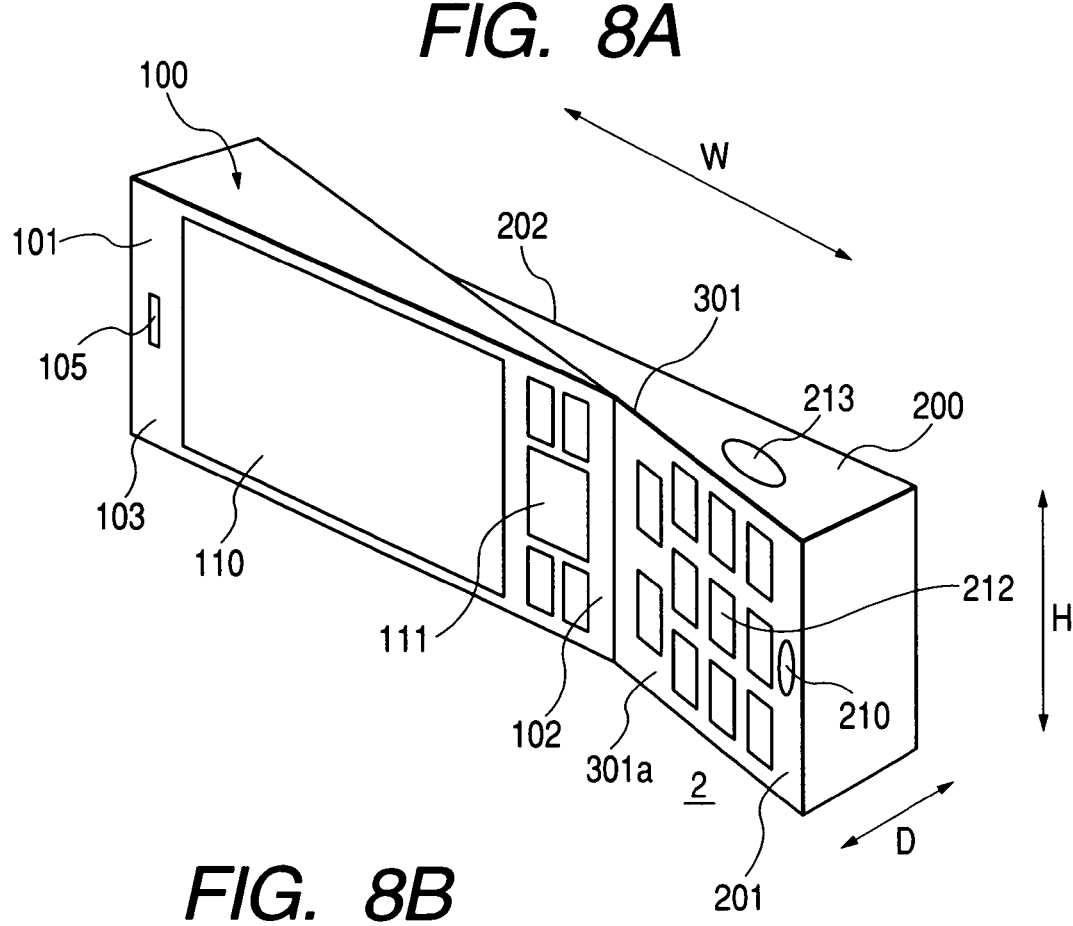
FIG. 8A
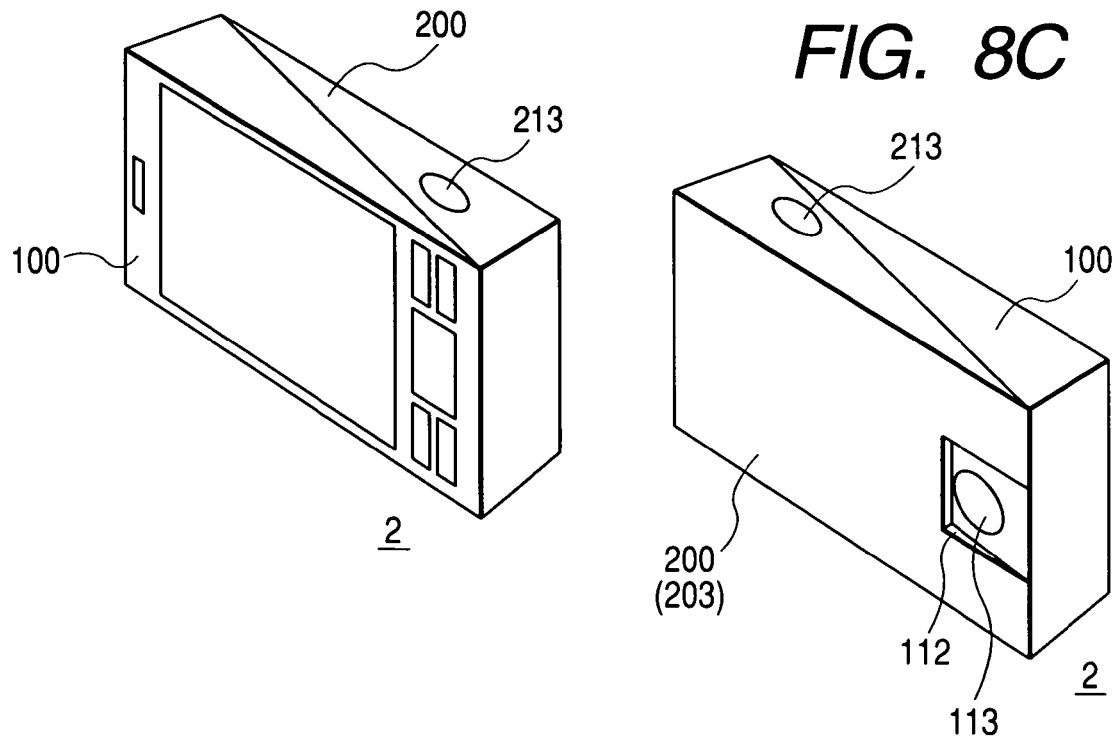
FIG. 8B
FIG. 8C

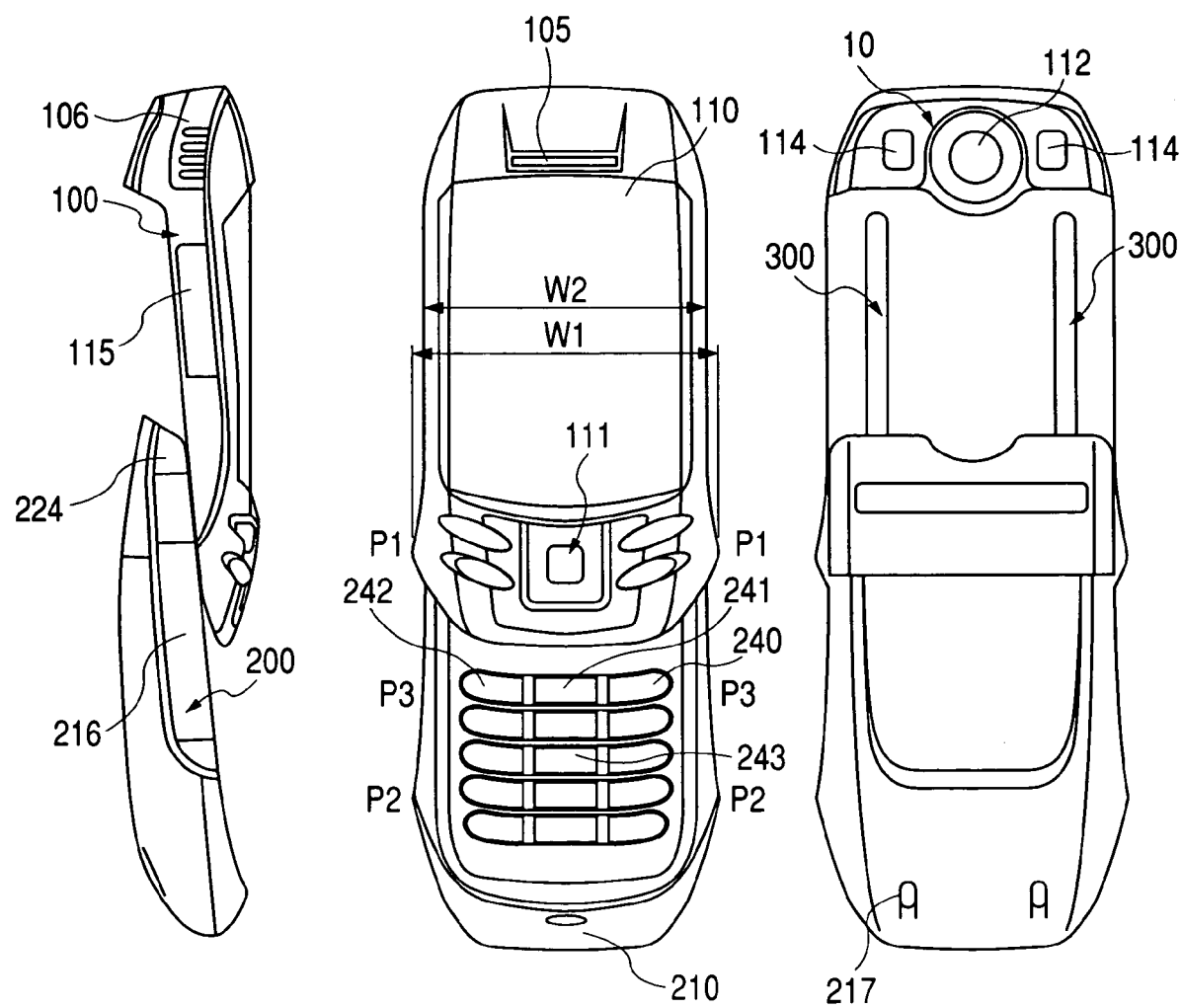

PORTABLE INFORMATION TERMINAL

FIELD OF THE INVENTION

The present invention relates to a slide type portable information terminal, which is configured by slidably coupling a plurality of bodies, achieving a compact form when it is shrunk, while obtaining a length that matches a distance between an ear and the mouth of a user when it is extended.

BACKGROUND OF THE INVENTION

In recent years, a portable phone provided with a camera function is getting in the lime light. As to such portable phone, one type now becomes mainstream, i.e., the type which is compact in size when it is carried, while its form is changed to a length that matches a distance between an ear and the mouth of a user upon talking on the phone. In those conventional arts, a type of phone that is foldable via a coupling between two bodies has been a mainstream, but recently, there are suggested another type of phones with various structures.

As one of those mentioned above, there is a type of phone that is configured by slidably coupling two bodies, so that a predefined length can be obtained, i.e., those bodies are in a state of overlapped when the phone is carried along or in case of photo-taking, while they slide to be extended in size, upon talking on the phone.

[Patent Document 1]
Japanese Patent Laid-Open No. 2003-32335

[Patent Document 2]
Japanese Patent Laid-Open No. 2003-110675

SUMMARY OF THE INVENTION

In the conventional arts as described above, since thin two bodies are slidably coupled, it is a major problem how to arrange internal equipment within those bodies. For example, if the internal equipment cannot be efficiently arranged, the device may be upsized, resulting in a loss of portability. In particular, since a camera mechanism tends to be upsized when an optical telescopic function is enhanced, there is a concern that this type of structure where two bodies are allowed to slide is not suitable for such camera mechanism.

There is a further problem that with such a slide type portable phone as described, a form of the phone obtained by allowing one thin body to simply slide over another thin body may cause a drop of the phone at the time of calling, or interfering with a proper posture during the calling since fingers holding the phone may touch a cheek of the user during when he or she talks on the phone.

Considering the above problems, an objective of the present invention is to provide a slide type portable information terminal having a favorable internal packaging efficiency, as well as a compact form.

In order to achieve the above objective, the present invention comprises a first body, a second body, and a slide mechanism for coupling the two bodies so that the two bodies are slidable in a direction, wherein, the slide mechanism couples the first body and the second body so as to take a first state where the second body overlaps the rear of the first body with a behind/front positional relationship, and a second state where the two bodies are moved away from each other in the direction, the first body in the first state includes a portion not overlapped by the second body at one end in the direction, and a camera unit is provided in the portion not overlapped.

In order to achieve the above objective, the present invention comprises a first body, a second body, and a slide mechanism for slidably coupling the two bodies, wherein, each of the first body and the second body constitutes a thin and flat body where a dimension in height direction is larger than a dimension in depth direction, as well as the dimension in width direction is larger than the dimension in height direction, and the thin and flat body has an outer appearance that the dimension in the depth direction becomes gradually thinner from one end to the other end in the width direction, the slide mechanism couples the first body and the second body so that an entire body is in both the first state where the two bodies are overlapped, and the second state where the two bodies are extended, the first body and the second body respectively include portions not overlapped in the first state, at the positions where the dimensions in the depth direction become the thickest, and the first body is provided with a camera unit in the portion not overlapped in the first state.

According to the present invention, it is possible to provide a slide type portable information terminal having a favorable internal packaging efficiency, as well as having a compact form.

BRIEF DESCRIPTION OF DRAWINGS

FIGS. 1A to 1D are external views of a portable information terminal (portable phone) relating to the present invention.

FIGS. 8A to 8C are external views of a portable information terminal (portable phone) of the second embodiment relating to the present invention.

FIGS. 17A to 17C are external views of the portable information terminal (portable phone) of the sixth embodiment relating to the present invention.

DESCRIPTION OF THE PREFERRED EMBODIMENTS

Figure 2:
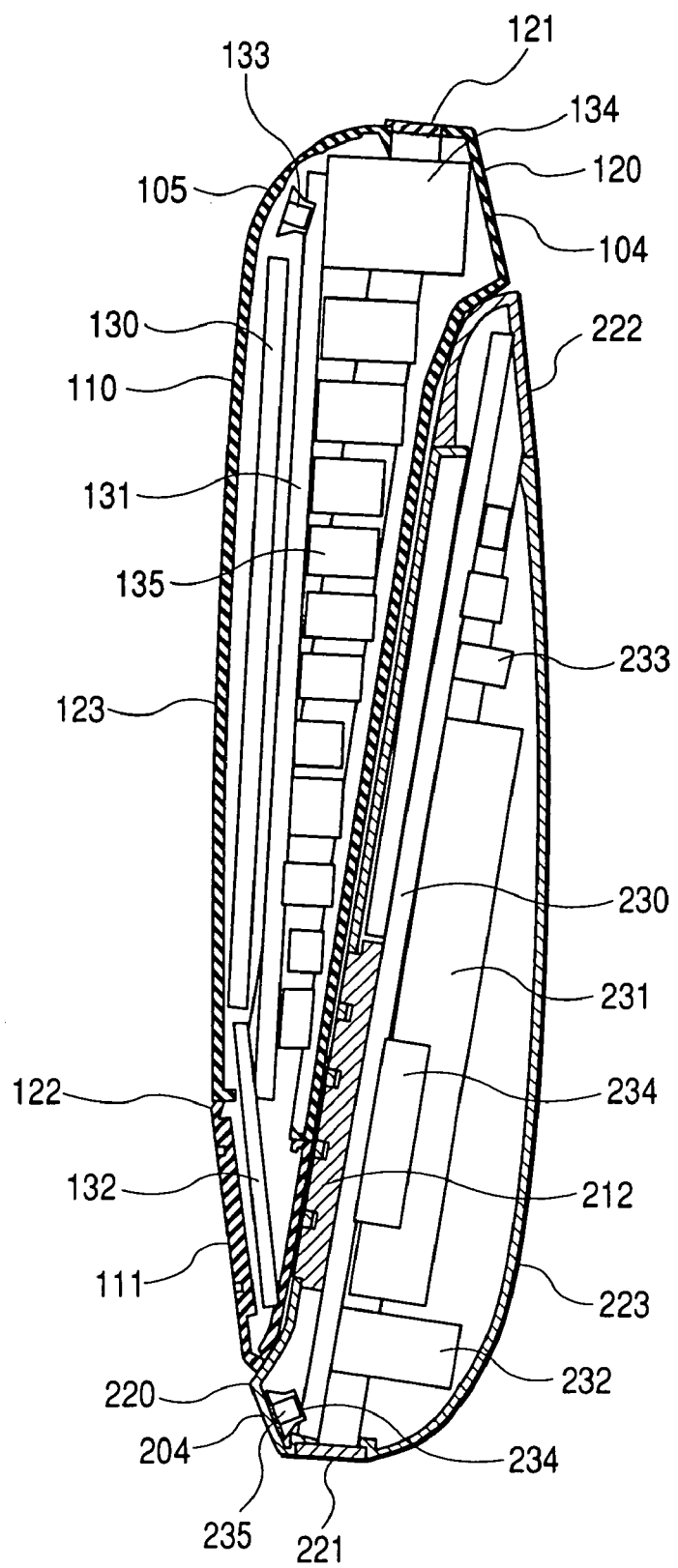
FIG. 2 is a cross sectional view of the portable information terminal (portable phone) relating to the present invention.

Hereinafter, preferred embodiments of a portable information terminal relating to the present invention will be explained, using a portable phone as a way of example, with reference to the attached drawings. Here, identical members and portions are represented by identical reference numerals and duplicated explanations will be omitted.

EXAMPLE 1

Figure 3A:
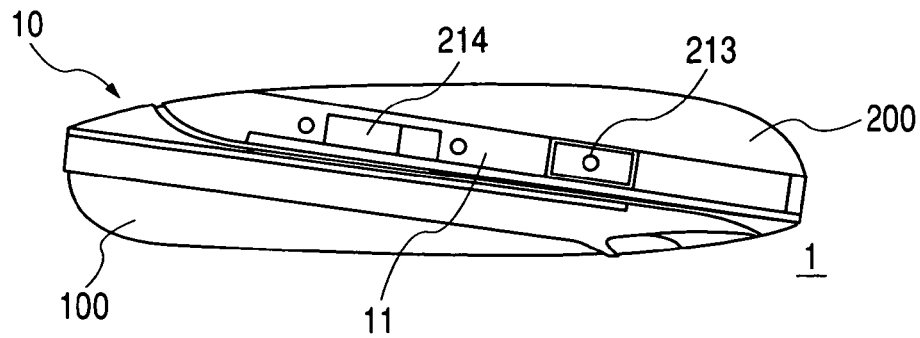
FIGS. 3A to 3D are external views of the portable information terminal (portable phone) relating to the present invention in a state that bodies thereof are shrunk.
Figure 3B:
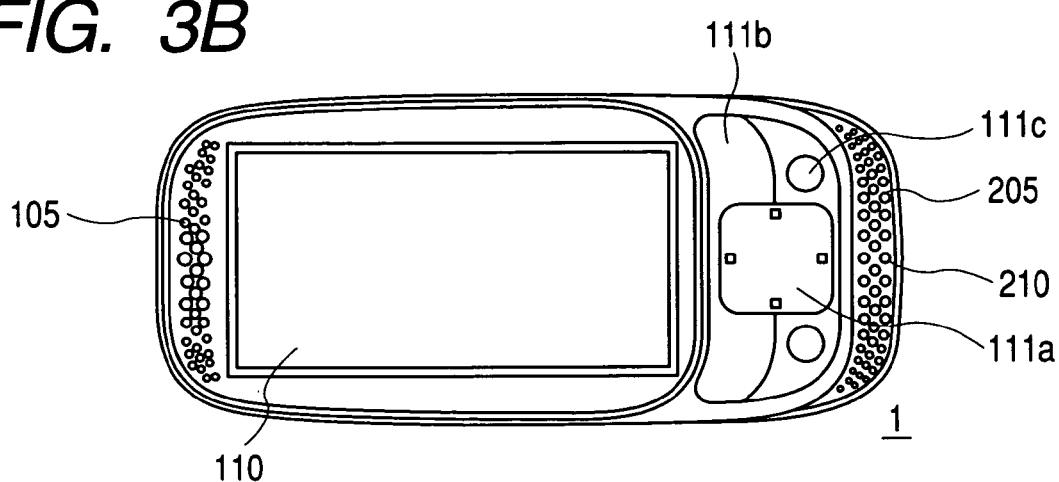
Figure 3C:
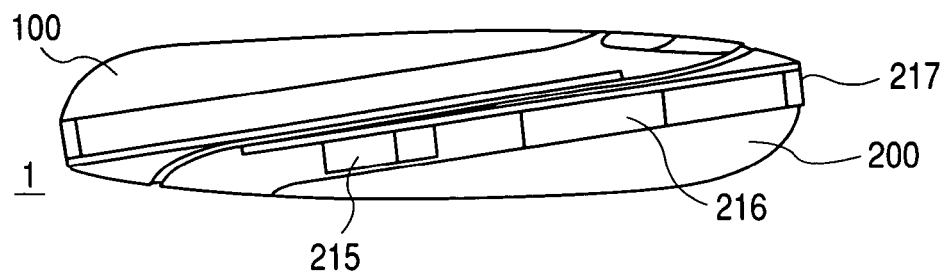
Figure 3D:
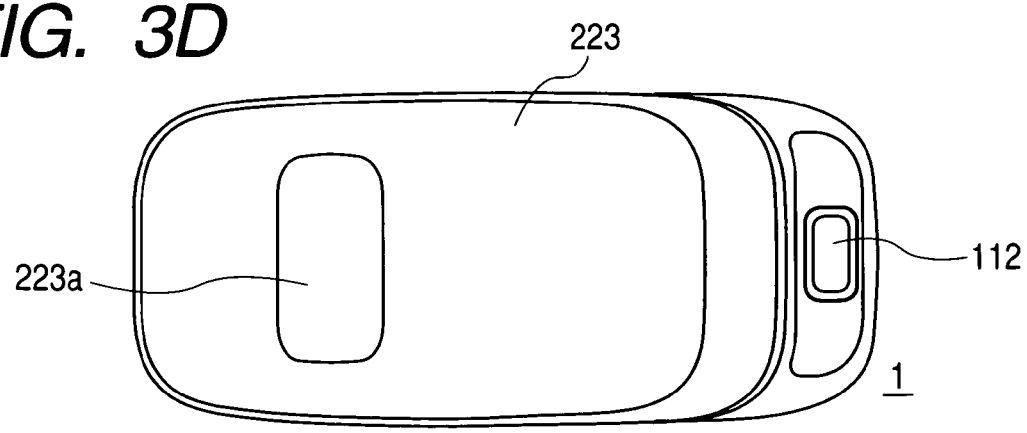
Figure 4A:
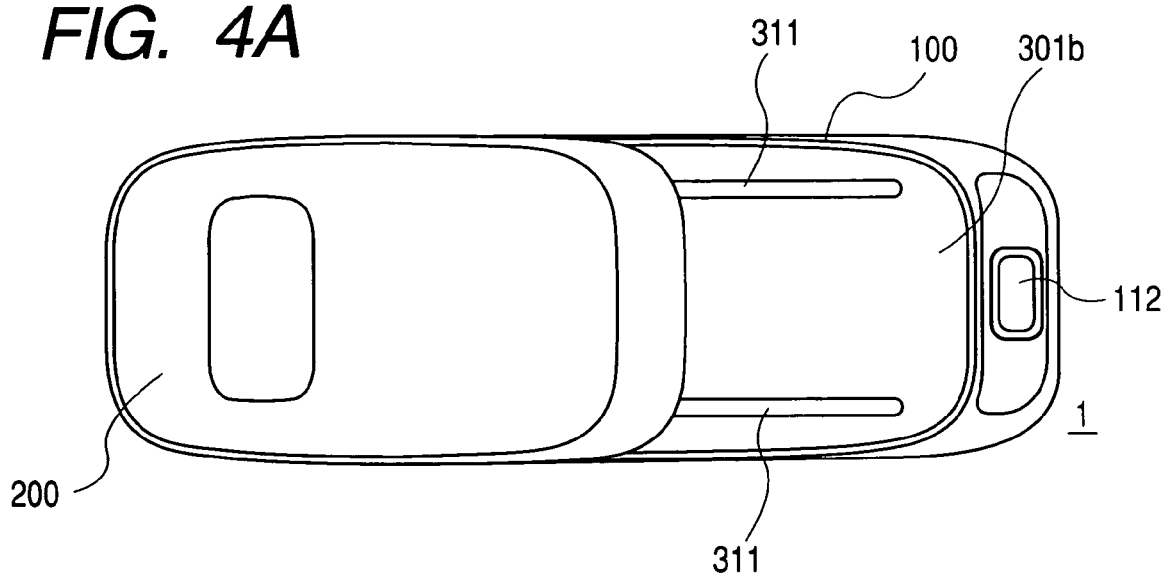
FIGS. 4A to 4C are external views of the portable information terminal (portable phone) relating to the present invention in a state that bodies thereof are extended.
Figure 4B:
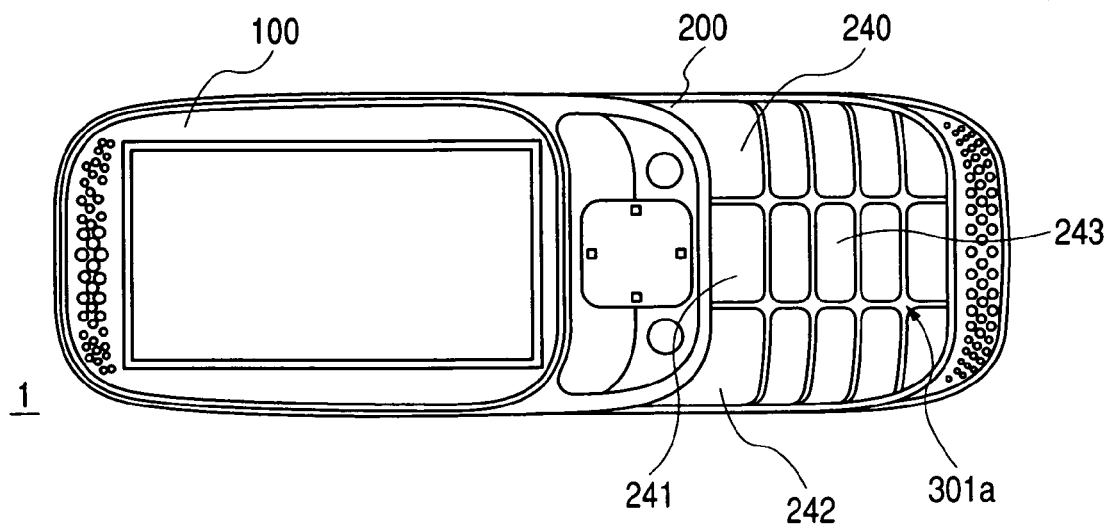
Figure 4C:
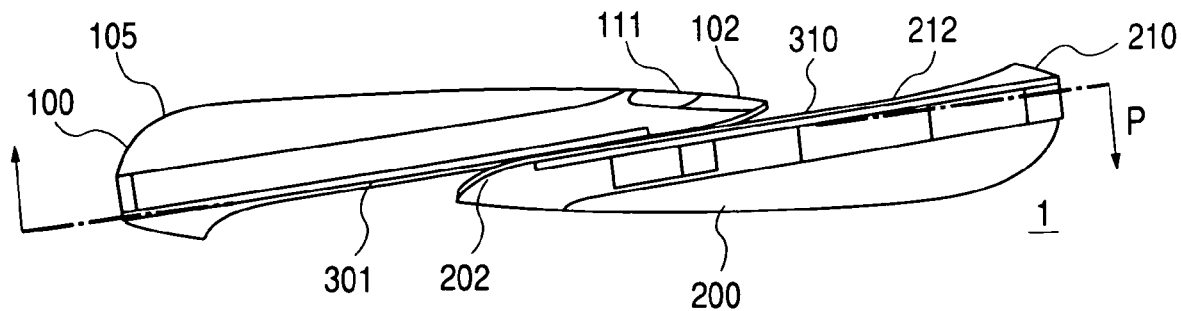
Figure 5:
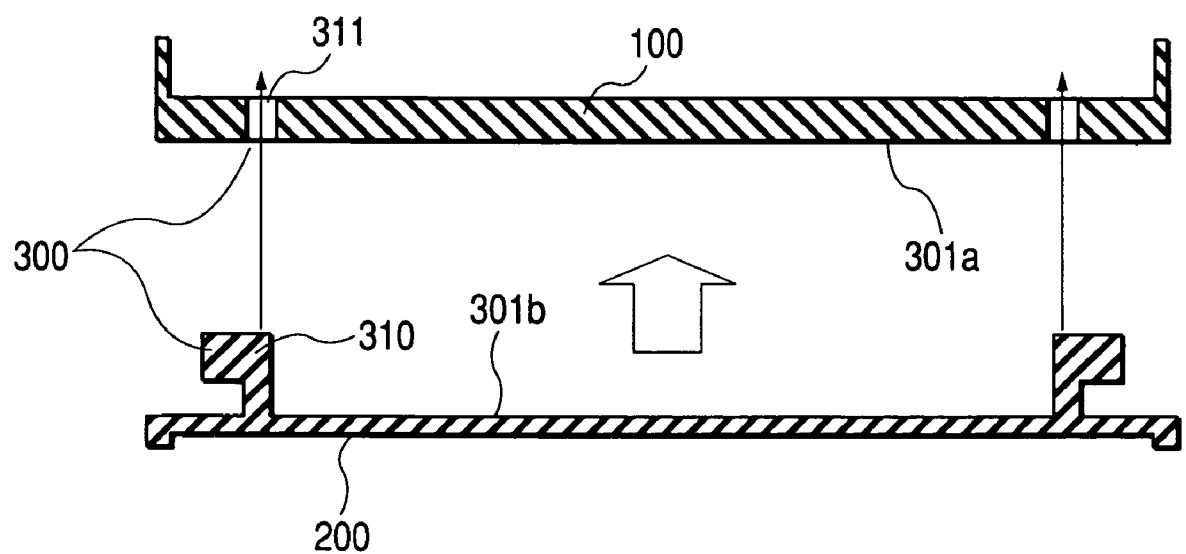
FIG. 5 is a cross sectional view showing a slide mechanism of the portable information terminal (portable phone) relating to the present invention.
Figure 6:
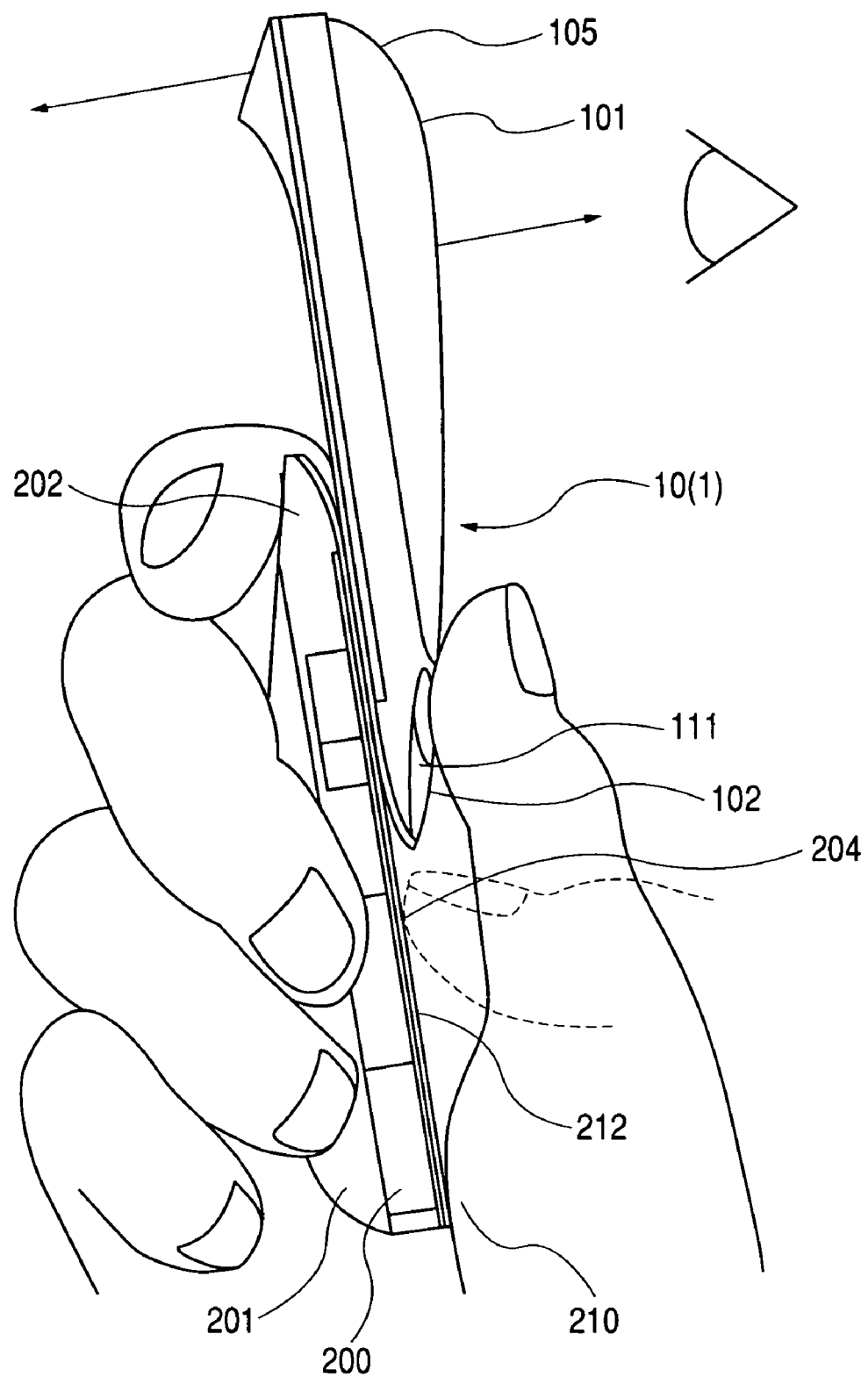
FIG. 6 is an explanatory diagram showing a holding posture in a state that the bodies of the portable information terminal (portable phone) relating to the present invention are extended.
Figure 7A:
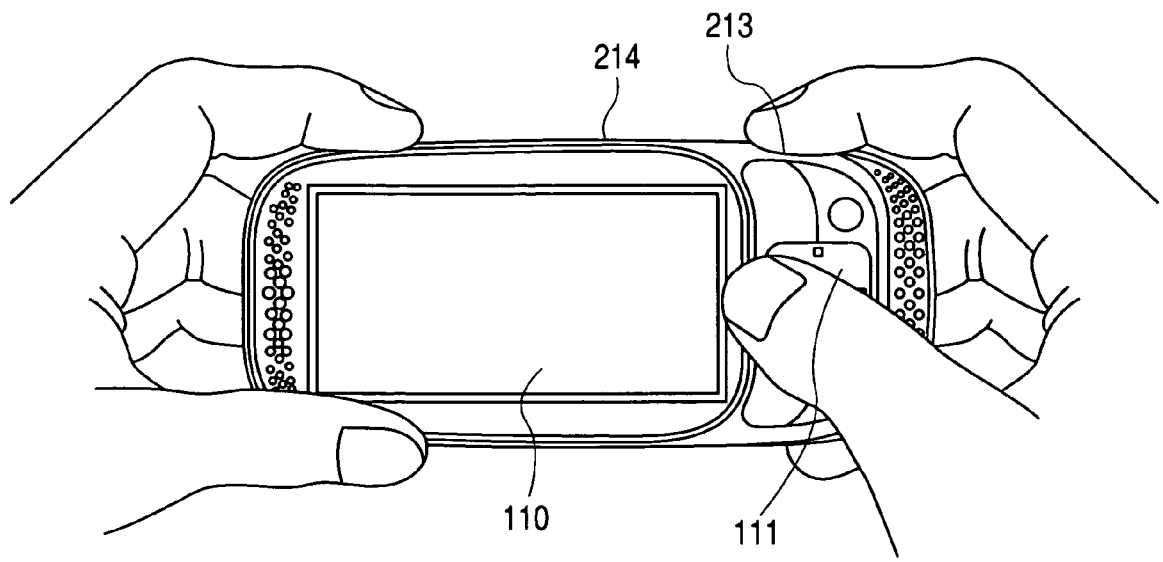
FIGS. 7A and 7B are explanatory diagrams of a picture taking posture with a camera in a state that the bodies of the portable information terminal (portable phone) relating to the present invention are shrunk.
Figure 7B:
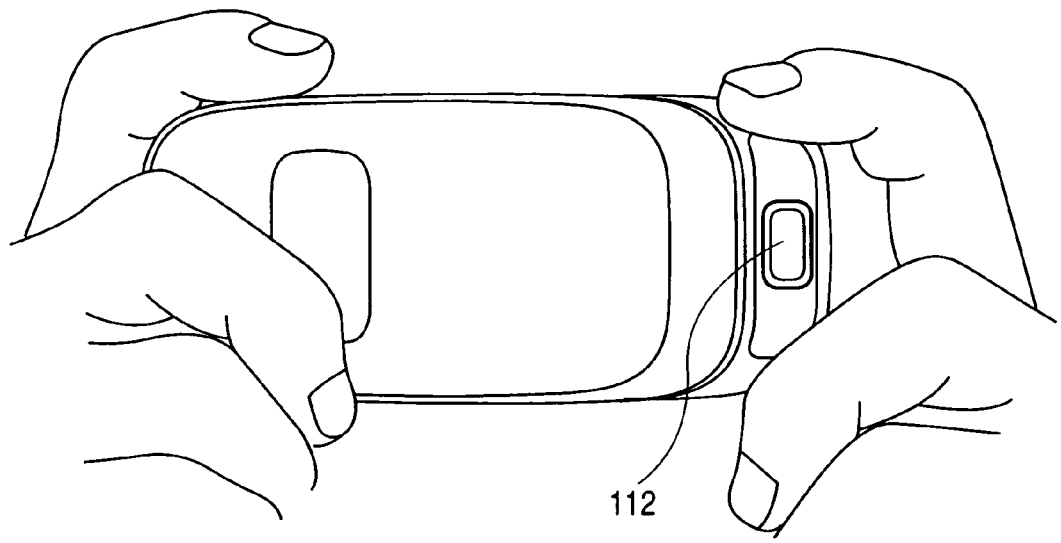

FIGS. 1A to 7B are diagrams showing the first embodiment of the portable information terminal relating to the present invention. FIGS. 1A to 1D are external views of a portable phone, FIG. 2 is a cross sectional view of the portable phone, FIGS. 3A to 3D are external views in a state that bodies thereof are shrunk, FIGS. 4A to 4C are external views in a state that bodies thereof are extended, FIG. 5 is a cross sectional view showing a slide mechanism, FIG. 6 is an explanatory diagram showing a holding posture in a state that the bodies are extended, and FIGS. 7A and 7B are explanatory diagrams of a picture taking posture with a camera in a state that the bodies are shrunk.

Firstly, with reference to FIGS. 1A to 1D, a schematic structure of the portable phone relating to the first embodiment of the present invention will be explained. FIG. 1A and FIG. 1B are perspective views in the first state where bodies are shrunk. FIG. 1A is a front view and FIG. 1B is a perspective view from the rear side. Furthermore, FIG. 1C and FIG. 1D are perspective views in a second state where the bodies are extended. FIG. 1C is a front view and FIG. 1D is a perspective view from the rear side.

The portable phone relating to the present embodiment is provided with functions such as a unit for reproducing TV broadcasting, various images or audio signals, and as an information terminal. The portable phone generally represented by the reference numeral 1 comprises a first body 100, a second body 200, and a slide mechanism 300 which slidably couples the two bodies. In the present embodiment, the entire body 10 constituted by the two bodies has a thin and flat rectangular parallelepiped shape, as a basic shape, in which the dimension in height direction H is larger than the dimension in depth direction D, and the dimension in width direction W is larger than the dimension in height direction H.

Then, in the present embodiment, the entire body is divided into two parts from side to side, with respect to the width direction W, and this division is made obliquely viewed from the top surface so that the two bodies are given behind/front positional relationship via the divided portion. In other words, in the present embodiment, the entire body 10 is constituted from the first body 100 and the second body 200, each having a divided portion the thickness of which gradually becomes smaller from one end to the other end in the width direction W, when viewed from the top surface.

Furthermore, the first and second bodies are combined in overlapped manner so that thick sides 101, 201 and the thin other sides 102, 202 are positioned to be front and behind, and the contact surface between the two bodies is defined as a slide surface 301. Then, the present embodiment is configured so that the two bodies slide in the width direction W of the entire body 10. Accordingly, as shown in FIG. 1A and FIG. 1B, in the first state where the two bodies are overlapped (shrunk) the shape of the body 10 is rectangular parallelepiped, that is, a thin box-type shape. In the second state where the two bodies are extended in the width direction W, it is possible to achieve a shape that both edges in the width direction W have a certain depth, whereas the midsection where the two bodies overlap each other is thinner.

Therefore, in the first state, the shape can be compact and superior in portability. On the other hand, in the second state where the two bodies are extended, by holding the longitudinal direction (width direction W) of thus extended body 10 vertically, it is possible to obtain a shape of the phone with a length suitable for the distance between user's mouth and ear, and good for holding.

Furthermore, in the present embodiment, it is possible in the first state to arrange a part 204 of the second body 200 in one side (thin other end side 102) of the wide surface (front surface) 103 of the first body 100. This part 204 of the second body 200 is constantly arranged in one side of the wide surface 103 of the first body 100. In other words, even when the two bodies are in the state of extended, it is possible to position the part 204 of the second body 200 in one side of the first body 100 in the width direction W.

In the present embodiment, in any of the first and second states, a second speaker section 205 is arranged on the part 204 of the second body 200 that is positioned in one side of the wide surface 103 of the first body 100. Then, a first speaker section 105 is arranged on the other side (thick one end side 101) of the first body 100, which is opposed to the part 204 of the second body 200. Then, a display section 110 is arranged on the wide surface 103 of the first body 100 between the two speaker sections. With the configuration as described above, in any of the first and second states, it is possible to position a pair of the speaker sections 105, 205 on the both sides of the display section 110. Therefore, by use of the positional relationship between the display section 110 and the speaker sections 105, 205, various images such as TV programs and reproduced videos are displayed on the display section 110, and simultaneously, a stereo sound can be outputted via the pair of speaker sections 105, 205, which are arranged on the both sides. Furthermore, in the present embodiment, between the display section 110 and the second speaker section 205 on the first body 100, a function keys section 111 is arranged. This function keys section 111 comprises a plurality of operation switches that are frequently used on the portable phone 1. Therefore, in the present embodiment, the function keys section 111 is always arranged in exposed manner in any of the first and the second states, so that it is possible to operate the phone in various modes via the function keys section 111.

Furthermore, in the present embodiment, a receiver section (not illustrated) is placed on one side (thick one end side 101) of the first body 100 and a microphone section 210 is placed on the part 204 of the second body 200. With this configuration, in the second state where the body 10 is extended, it is possible to arrange the receiver section on one end side of the longitudinal direction (width direction W) and to arrange the microphone section 210 on the other end, so as to respectively match the positions of user's ear and mouth. On the other hand, since the microphone section 210 is installed in exposed manner even in the first state, it is also possible to use the microphone section for the purpose of recording in the first state.

Further in the present embodiment, in the first state, the backside of the body 10 is configured, similar to the front side as described above, such that a part 104 of the first body 100 is positioned in one side (thin other end side 202) of the second body 200. The part 104 of the first body 100 is also configured such that it is constantly exposed to outer surface of the body 10 in any of the first and the second states. In the present embodiment, a picture taking window 112 of the camera unit is mounted on the part 104 of the first body 100. Therefore, in the present embodiment, in any of the first and the second states, it is possible to take a picture by use of the picture taking window 112.

Then, as one of the features of the present embodiment, it is possible to arrange the camera unit in the rear of the picture taking window 112, that is, in deepest part (thick one end side 101) of the first body 100. With this configuration, it is possible to handle upsizing of the camera unit, while reducing the upsizing of the body 10. In other words, a portable phone having a conventional structure is generally divided into two parts in the depth direction D, and those parts slide in the direction orthogonal to the depth direction. If the camera unit is arranged in the conventional structure, the camera unit is to be arranged within a part obtained by dividing the body into two parts in the depth direction D. Therefore, when the camera unit is upsized, there is a problem that the body of the phone is to be necessarily upsized. According to the present embodiment, the camera unit can be arranged in the thicker part of the first body 100, the thickness corresponding to the dimension of depth direction D of the body 10. Therefore, it is possible to handle upsizing of the camera unit, while reducing the upsizing of the body 10.

On the other hand, since on the end side with smaller depth (thin other end side 102) of the first body 100, there is arranged the function keys section 111, it is possible to arrange a plate-like operation substrate in the part being thin in the depth direction. With this configuration, the dead space can be reduced.

It is to be noted that in the present embodiment, a battery section having a large volume is arranged in the part thicker in the depth direction (thick one end side 201) of the second body 200 (see FIG. 2), and a substrate is arranged in the part thinner in the depth direction (thin other end side 202). Therefore, the particular shape as described above can be implemented without a loss of equipment packaging efficiency.

Furthermore in the present embodiment, an alphanumeric input keys section 212 is arranged on the slide surface 301a of the second body 200 exposed in the second state. The alphanumeric input keys section 212 is used in the second state, that is, in a posture of calling or character-inputting. Therefore, such operation keys which are not used in the first state, that is, in a posture for putting away or picture taking, can be concealed. Conversely, since the operation keys used in the second state can be exposed just by changing the state from the first to the second, operability is enhanced.

Furthermore, on the side having a depth of the second body 200, which becomes a top surface in the first state, there are arranged a shutter switch 213 and a mode changeover switch 214. With this configuration, when a picture is taken by the camera function in the first state, the switches 213, 214 installed on the top surface can be operated, while the body 10 is held by the right hand. Further in the present embodiment, since the longitudinal direction (width direction W) is positioned laterally, a picture can be taken while the ends on the both sides are held by the both hand respectively. Therefore, it is possible to prevent camera shake. Moreover, in the present embodiment, the speaker sections 105, 205 are arranged on the both ends, the spaces where the speaker sections arranged can be used as grip sections. With this configuration, it is possible to reduce a risk that the hands holding the both ends may cover the display section 110 that displays the image to be taken (see FIG. 7).

In the present embodiment, it is also possible to take a picture by holding the both ends thus extended vertically in the second state. In this posture of picture taking, a shooting switch is allocated to a particular key on the function keys section 111. Therefore, the user holds the second body 200 side by one hand, and can perform the picture taking operations by use of thumb of the hand that is holding the phone (see FIG. 6).

As thus described, in the present embodiment, the first body and the second body constituting the body 10, are respectively wedge-shaped, becoming thinner from one side having a depth to the other side so that the first body 100 constitutes the front surface and one side surface of the body 10, and the second body 200 constitutes the backside and the other side surface of the body 10. Furthermore, in the present embodiment, the two bodies are made wedge-shaped, and in each body, one end in the longitudinal direction (width direction W) is made to be thick in the depth dimension, and the other end is formed to be sharp. With this configuration, since it is possible to secure a space enough for internal packaging in the depth direction D inside of the thick side area, internally packaged elements having a depth can be arranged by use of this wide space. In particular, since the camera unit is upsizing in recently developed portable mobile terminals, the present embodiment is advantageous in the point that the camera unit corresponding to the dimension in the depth direction D of the body 10 can be arranged.

On the other hand, in the sharp side, it is possible to arrange within the internal space thereof, an operation substrate or a control substrate relatively small in size. Moreover, difference in levels between the first body 100 and the second body 200 caused by extending in the width direction W can be reduced.

Furthermore, in the state the two wedge-shaped bodies are extended, it is possible to obtain a shape that the both ends in the longitudinal direction (width direction W) are thick (large dimension in the depth direction D), as well as the midsection is thin, being suitable for the calling posture.

In FIG. 1D, reference numeral 301b represents a slide surface of the first body 100, which is exposed in the state where the two bodies are extended.

Hereinafter, with reference to FIG. 2 to FIG. 7B, more detailed explanations as to the portable phone relating to the present embodiment will be made. For ease of explanation, the portable phone 1 as shown in FIGS. 1A to 1D is linearly illustrated with a schematic diagram. However, in FIG. 2 to FIG. 7B, an outer appearance that is applied to an actual phone is illustrated.

Firstly, with reference to FIG. 2, the arrangement configuration of the internally packaged equipment will be explained. In FIG. 2, the first and the second bodies are configured by internal covers 120, 220 constituting the slide surface 301, and external covers 121, 221 covering the outside of the body 10.

The internal cover 120 of the first body 100 comprises a slide surface 301a and a part 104 of the first body 100 that is formed to be constantly exposed to the back side of the body 10. On the other hand, the external cover 121 of the first body 100 covers the entire front surface side of the first body 100, and on the front thereof, the function keys section 111, the display section 110 and the first speaker section 105 are arranged. This internal cover 120 and the external cover 121 are coupled via a split groove formed on the surrounding side surface (top and bottom surfaces and left side surface) of the first body 100, and fixed by way of screws and the like which are not illustrated. Furthermore, the external cover 121 comprises a base body 122 that is a base of the external cover 121, and a part of the base body 122, i.e., a transparent face cover 123 which is formed so that it separates the display section 110 and the speaker section 105 from the other outer covering. It is to be noted here that the face cover 123 is transparent at the part corresponding to the display section 110, and other surroundings are subjected to internal coating, thereby achieving an enhanced property in design.

Furthermore, similar to the first body 100, in the second body 200 the internal cover 220 comprises a slide surface 301b, and a part 204 of the second body 200, which is formed so that it is constantly exposed to the front side of the body 10. The external cover 221 of the second body 200 comprises a base body 222 which is a base of the external cover 221, and a battery cover 223 that is detachably mounted so that it covers a part of the base body 222.

Here, in the present embodiment, in order to arrange the internal equipment efficiently within a space the cross sectional shape of which is approximately triangle, in the first body 100, the internal equipment is arranged with respect to the wide surface 103 of the first body 100, and in the second body 200, the internal equipment is arranged with respect to the slide surface 301.

In other words, in the present embodiment, since the display section 110 is arranged on the wide surface 103 of the first body 100, a liquid crystal device 130 is arranged inside of this wide surface 103 so that it becomes parallel with the wide surface 103, and in the rear (inside) thereof, a first substrate 131 is mounted also in parallel. Then, on the sharp part (thin other end side 102) of the first body 100, there are mounted the function keys section 111, including a plurality of switches, and the operation substrate 132 for the function keys section 111. Further on the thick part (thick one end side 101) of the first body 100, the first substrate 131 is provided in extended manner. On the outside thereof, there is mounted a speaker unit 133 constituting the first speaker section 105, and inside thereof, the camera unit 134 is mounted. Then, substrate components 135 are mounted so that they fit into the space having a triangle-like cross section which is formed inside of the first substrate 131, i.e., between the first substrate 131 and the slide surface 301a.

On the other hand, inside of the second body 200, there is arranged a second substrate 230 to be parallel with the slide surface 301, and inside of the thick part in the depth direction of the second body 200 (slide surface 301a side), there are arranged alphanumeric input keys section 212, a speaker unit 234 constituting the second speaker section 205, and a microphone unit 235 constituting the microphone section 210. Outside thereof, there are mounted a detachable battery section 231, an external connection terminal section 232, and an antenna 234. Furthermore, in the space of triangle-like cross section outside of the second substrate 230, substrate components 233 are mounted, being various in sizes to fit into the space.

Next, with reference to FIGS. 3A to 3D, the outer appearance of the portable phone 1 in the first state will be further explained. FIG. 3A is a top view, FIG. 3B is a front view, FIG. 3C is a bottom view, and the FIG. 3D is a rear view.

In FIGS. 3A to 3D, the outer appearance of the portable phone 1 is a shape being rounded entirely, by cutting off sharp edges of a box-like form. In other words, as shown in FIG. 3A and FIG. 3C, this portable phone 1 has a widely rounded shape by cutting the edges on one end side 101 of the first body 100 and on one end side 201 of the second body 200, in the front side or in the rear side. Furthermore, with regard to the portions from the thin other end sides 102, 201 respectively to the parts 104, 204 of the two bodies, continuous gradual curved surfaces are formed. In the meantime, there are large roundness at the four corners as shown in FIG. 3B and FIG. 3D.

As thus described, the portable phone 1 has an outer appearance of the body 10, like a rounded box-shaped soap. Therefore, when it is on one's hand, it can be held fitting into the hand, thereby achieving a compact form superior in portability. Particularly, in the present embodiment, while the longitudinal direction (width direction W) is positioned laterally, the phone can be held in such a manner as fitting into one's hand or hands, in any cases where a picture can be taken by holding one end side of the body 10 with one hand, or by holding both ends with both hands. Furthermore, with such a rounded compact form, it is easy to put the phone in a pocket and the like. As for the portable phone 1, since corner portions are cut off, in which internally packaged elements are hard to be mounted, a shape superior in portability can be attained without loss of the internal packaging efficiency.

Further in the present embodiment, as shown in FIG. 3A and FIG. 3B, a bumper section 11 is formed along the slide surface 301 which orthogonally divides the body 10, and functional components are arranged in a concentrated manner on the bumper section 11. For example, on the top surface of the phone as shown in FIG. 3A, there are arranged a shutter switch 213 and a mode changeover switch 214. On the bottom surface as shown in FIG. 3C, there are arranged a manner mode setting key 215 and an external connection terminal section 232 covered with a detachable external connection terminal cover 216, and also on the right side surface, not illustrated, there is mounted a charging terminal section 217. The external connection terminal section 232 is exposed by removing the external connection terminal cover 216, thereby allowing a recording medium such as a memory card to be inserted therein, or external devices and the like to be connected. Since the functional components arranged on the bumper section 11 are directly mounted on the second substrate 230, assembling can be simplified and wiring can be shortened.

As shown in FIG. 3B, in the present embodiment, a tuner not illustrated is built in, which is capable of receiving ground-based digital broadcasting. In order to be adaptable to the ground-based digital broadcasting, the display section 110 employs a liquid crystal device 130 having a ratio of 16:9. Then, in the present embodiment, a screen changeover switch is provided, not illustrated, which operates in conjunction with the operation of the slide mechanism 300. With the operation of the screen changeover switch, in the first state as shown in FIGS. 3A to 3D, the screen is displayed horizontally, whereas in the second state as shown in FIG. 4, the screen is displayed vertically.

Therefore, in the first state as shown in FIGS. 3A to 3D, the ground-based digital broadcasting can be enjoyed with the favorable landscape screen. Moreover, on the both sides of the display section 110, there are arranged a pair of speakers 105, 205, it is possible to use the portable phone 1 with a sense of watching a small-sized television.

Furthermore, in the present embodiment, the function keys section 111 for operating the ground-based digital broadcasting is arranged adjacent to the display section 110. In the present embodiment, by operating the function keys section 111, a menu screen or various selection display screens are displayed on the display section 110, and selection and decision are made from various icons and function keys displayed on the screen.

This function keys section 111 comprises a cursor decision key 111a that is arranged in the center, and a pair of selection keys 111b, 111c formed on the both sides thereof. The cursor decision key 111a has a quadrangular key shape, and by pressing any of the edges in the four directions the cursor displayed on the display section 110 can be moved into the direction corresponding to the direction of the edge thus pressed. By pressing the center of the cursor decision key, a function that is allocated to one of various icons or function keys 111a, which has been selected by the cursor, can be executed.

In the meantime, as to each of the pair of selection keys 111b, 111c, various functions can be determined by pressing upper and lower portions using the center as a fulcrum. For example, the upper portion and the lower portion of the selection key 111b allows the user to select one function out of the functions respectively set corresponding to the selection keys displayed on the adjacent display section 110. As for the upper portion and the lower portion of the selection key 111c, there are respectively allocated a network key and a mail key in the initial setting.

In FIG. 3D, the battery cover 223 is mounted in such a manner as sliding into the right direction in the width direction W, and the reference numeral 223a represents a concave portion to put one's finger on, so as to move this battery cover 223.

Next, with reference to FIGS. 4A to 4C, outer appearance of the second state where two bodies are extended will be explained. Here, FIG. 4A shows a rear view, FIG. 4B is a front view, and FIG. 4C is a bottom view. It is to be noted that in the second state, the phone is held and used assuming that both ends of the longitudinal direction (width direction W) as upside and downside respectively.

As shown in FIGS. 4A to 4C, in the present embodiment, the slide surface 301 of the two bodies comprises a slide mechanism 300 for extending the two bodies. An example of this mechanism is shown in FIG. 5.

FIG. 5 shows a schematic structure of the slide mechanism 300. The upper portion represents the first body 100, and the lower portion represents the second body 200. On the slide surface 301b of the second body 200, there are provided a pair of slide projections 310, and on the slide surface 301a of the first body 100, there are provided slide groove portions 311 at the positions corresponding to the slide projections 310 respectively. The slide projections 310 are inserted into the slide groove portions 311, and the slide projections 310 are not detached from the slide groove portions 311 by means of the raised parts formed on the tip ends of the slide projections 310.

The slide groove portions 311 are formed to be long in the width direction W as shown in FIG. 4A. Also, the slide projections 310 mounted on the slide groove portions 311 are formed to be long in the width direction W. With this configuration, the two bodies can slide in the width direction W, whereas it is not possible for the two bodies to move to the other directions. Furthermore, the length of the slide groove portion 311 is set longer than that of the slide projection 310 by the length corresponding to the difference of length obtained when the state is changed from that in FIG. 3 to that in FIG. 4.

As shown in FIG. 4B, in the present embodiment, main use purposes in the second state are defined as calling and mail functions. Therefore, in the alphanumeric input keys section 212 arranged on the slide surface 301a exposed in the second state, there are provided function keys to be used for calling and mail functions. For example, in the present embodiment, the alphanumeric input keys section 212 comprises a calling ON/OFF key 240, which performs power ON/OFF and displays a screen of standby status on the display section 110, a clear key 241, a calling key 242, and numeric-character keys 243 including a plurality of keys.

It is a matter of course that even in the second state, picture taking with the camera unit 134 is possible. When the picture-taking is performed, a menu screen is displayed by operating the cursor decision key 111a, and a picture-taking mode is selected on the menu screen. Then, a pair of selection keys 111b is set as the picture-taking function keys, and a picture-taking can be performed by operating these function keys.

As shown in FIG. 4C, in the present embodiment, since wedge-shaped two bodies are combined and configured to be slidable, it is possible to make a form optimal for the functions as a phone in the second state. In other words, the form conventionally used as a handset has a shape that the microphone section 210 and the speaker (the first speaker section 105) jut out towards the user side comparing to the portion to hold the handset. This is because even when the user brings one's mouth and ear into intimate contact with the microphone section 210 and the speaker respectively, it is possible to securely hold the handset. In the present embodiment, by changing the state from the first to the second, a form similar to the conventional handset can be taken.

In other words, in the present embodiment, the first speaker section 105 stands up towards the user side (upper side in FIG. 4C), with respect to the extension P of the slide surface 301 on which the microphone section 210 is arranged. Therefore, similar to the conventional handset, it is possible to allow the surfaces where the microphone section 210 and the first speaker section 105 are arranged to jut out towards the user side. Furthermore, in the midsection, the thin other end side 102 of the first body 100 continues to the extension P, with reducing difference in level. Therefore, the function keys section 111 and the alphanumeric input keys section 212 can be configured as a continuous group of keys, thereby enhancing operability of the keys.

On the other hand, the portion where the microphone section 210 is arranged is formed by jutting out towards the opposite side of the user (lower side in FIG. 4C) with respect to the extension P of the slide surface 301. In other words, in the present embodiment, since the rear of the microphone section 210 stands up towards the opposite side of the user (lower side in FIG. 4C) with respect to the extension P of the slide surface 301 on which a picture taking window 112 is arranged, the rear of the microphone section 210 and the surface on which the picture taking window 112 is arranged are allowed to jut out towards the opposite side of the user. Moreover, in the midsection, the thin other end side 202 of the second body 200 continues to the extension P, with reducing difference in level, and the backside of the body 200 can be a continuous holding surface. Therefore, it is possible to achieve a favorable holding feature suitable for the calling posture and for mail inputting posture.

Next, with reference to FIG. 6, FIGS. 7A and 7B, a method for using the portable phone 1 according to the present embodiment will be explained. Firstly, in FIG. 6, the power of the portable phone 1 becomes "ON" by pressing and holding the calling ON/OFF key 240 in the second state. Then, the portable phone 1 becomes in receiving standby mode. The power becomes "OFF" by pressing and holding the calling ON/OFF key 240 again.

In the second state while the power is "ON", the phone is held with a posture as shown in FIG. 6, and it is possible to operate the alphanumeric input keys section 212 or the function keys section 111 with a thumb as indicated by the dotted line. In the operation with the thumb, since the surface where the function keys section 111 is arranged so that it continuously stands up with respect to the surface where the alphanumeric input keys section 212 is arranged, excellent operability with the thumb can be obtained. Furthermore, since the body 10 is held in such a manner that the thick one end side 201 on the rear side of the second body 200 is put in the palm of one's hand and the thin other side 202 is held by the forefinger, the phone can be hold favorably in the second state.

In particular, in the second state as shown in FIG. 6, since the whole second body 200 can securely fit into the palm of one's hand, and excellent operability with the thumb is achieved, it is expected that shaking of the body is more reduced than a portable phone having a conventional slide mechanism. Further in the present embodiment, a calling posture can be taken just by shifting the thumb to the side surface of the body 10, from the second state as shown in FIG. 6. In this calling posture, even when the microphone section 210 and the first speaker section 105 (receiver section) are allowed to come close to the mouth and ear of the user, there is less possibility that the function keys section 111 and the alphanumeric input keys section 212 may come into contact with the cheek of the user.

Next, with reference to FIGS. 7A and 7B, a method for using the phone in the first state will be explained. FIGS. 7A and 7B show a posture for holding the portable phone 1 by holding both ends in the longitudinal direction (width direction W) with both hands. FIG. 7A is a state viewed from the front side (user side), and FIG. 7B is a state viewed from the rear side (photogenic subject side).

According to the present embodiment, for example, the middle fingers, the forefingers, and the thumbs of both hands are respectively positioned at the downward rear side, at the top surface side, and at the front side of the body 10, whereby it is possible to securely hold the body 10. Then, with this holding posture, the function keys section 111 can be operated by the thumb of the right hand, and the shutter switch 213 and the mode changeover switch 214 are operated by the forefinger of the right hand. Moreover, with the holding posture as shown in FIGS. 7A and 7B, it is possible to take a picture or monitor a taken image, without concealing the picture taking window 112 and the display section 110 with any of the fingers.

EXAMPLE 2

FIGS. 8A to 8C are external views showing the second embodiment of the portable information terminal (portable phone) according to the present invention. FIG. 8A is a perspective view, viewed from the front side in the second state, FIG. 8B is a perspective view viewed from the front side in the first state, and FIG. 8C is a perspective view viewed from the rear side in the first state.

In FIGS. 8A to 8C, the portable phone generally represented by the reference numeral 2 comprises a first body 100, a second body 200, and a slide mechanism 300 slidably coupling the two bodies. In the present embodiment, the entire body 10 constituted by the two bodies has a thin and flat rectangular parallelepiped shape, as a basic shape, in which the dimension in height direction H is larger than the dimension in depth direction D, and the dimension in width direction W is larger than the dimension in height direction H.

Then, viewed from the top side of the portable phone 2, the shape of the top surface being approximately rectangle is divided at the diagonal line into two parts, in front and behind, and the front portion is defined as the first body 100, and the rear portion is defined as the second body 200. The two bodies can slide in the width direction W, via the slide mechanism 300, which is provided on the slide surface 301, being a plane to mutually divide the both bodies.

As thus described, in the present embodiment, the first and the second bodies have respectively being thicker at one side in the width direction W of the body 10, and the shapes of the bodies become thinner from the thick one side towards the other side. Then, the first and second bodies are overlapped so that the thick sides 101, 201 and the other thin sides 102, 202 are combined to be positioned front and behind, and the contact surface between the two bodies is defined as a slide surface 301. Then, they are structured so that the bodies slide in the width direction of the body 10. Accordingly, in the first state where two bodies are overlapped, the body 10 has a rectangular parallelepiped, i.e., thin box-like shape. On the other hand, in the second state where the two bodies are extended in the width direction, the shape is such that both ends in the width direction have a depth, and the midsection where the two bodies are overlapped is relatively shallow.

Therefore, it is possible to make a shape in the first state superior in portability, as well as in the second stage being extended, the extended body 10 can be held by rendering the longitudinal direction vertical, whereby the shape of the body can be changed so as to obtain a length suitable for the distance from the ear to mouth of the user, and a shape favorable in holding property.

Furthermore, in the present embodiment, the display section 110 is provided at the center of the wide surface 103 (front surface) of the first body 100, a first speaker 105 and a receiver section (not illustrated) are arranged on the thick end side, whereas a function keys section 111 is arranged on the tapered end side.

On the other hand, at the end (thin end side 202) of the tapered side of the wide surface 203 (backside) of the second body 200, a picture taking window 112 or a notched portion for camera is arranged. Then, on the slide surface 301a of the second body 200, which is exposed in the state where the two bodies are extended, there are arranged an alphanumeric input keys section 212 and a microphone section 210. Further on the slide surface 301b of the first body, a lens section 113 of the camera unit 134 is arranged. This camera section overlaps the picture taking window or the notched portion for camera in the first state that the two bodies are shrunk, whereby it is possible to take a picture by the camera even in the first state.

On the side having a depth of the second body 200, which constitutes a top surface in the first state, there is arranged a shutter switch 213. With this configuration, if a picture is taken by the camera unit in the first state, it is possible to operate the shutter switch 213 provided on the top surface, while the body is held by the right hand.

As thus described in the present embodiment, the first body and the second body are respectively wedge-shaped, becoming thinner from one side having a depth to the other side, so that the first body 100 constitutes the front surface and one side surface of the body 10, and the second body 200 constitutes the backside and the other side surface of the body 10. Furthermore, in the present embodiment, since the two bodies are made wedge-shaped, in each body, one end in the longitudinal direction is made to be thick in the depth direction, and the other is made to be sharp. With this configuration, it is possible to secure a sufficient internal packaging space in the depth direction within the internal portion of the thick side. Therefore, internally packaged elements even having a certain depth can be arranged by use of this wide internal packaging space.

On the other hand, in the sharp side, it is possible to arrange within the internal space thereof, an operation substrate or a control substrate relatively small in size. Moreover, difference in levels between the first body 100 and the second body 200 caused by extending the bodies in the width direction can be reduced.

Furthermore, in the state the two wedge-shaped bodies are extended, the both ends in the longitudinal direction are thick (large in the depth direction), as well as the midsection is thin. Therefore, it is possible to obtain a good shape of the phone, suitable for the calling posture.

EXAMPLE 3

Figure 9A:
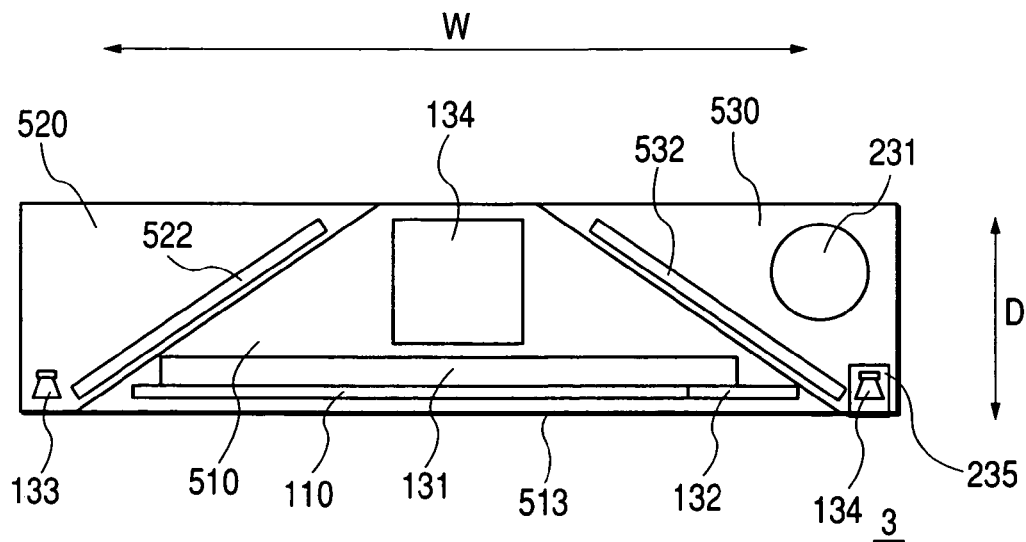
FIGS. 9A to 9B are external views of a portable information terminal (portable phone) of the third embodiment relating to the present invention.
Figure 9B:
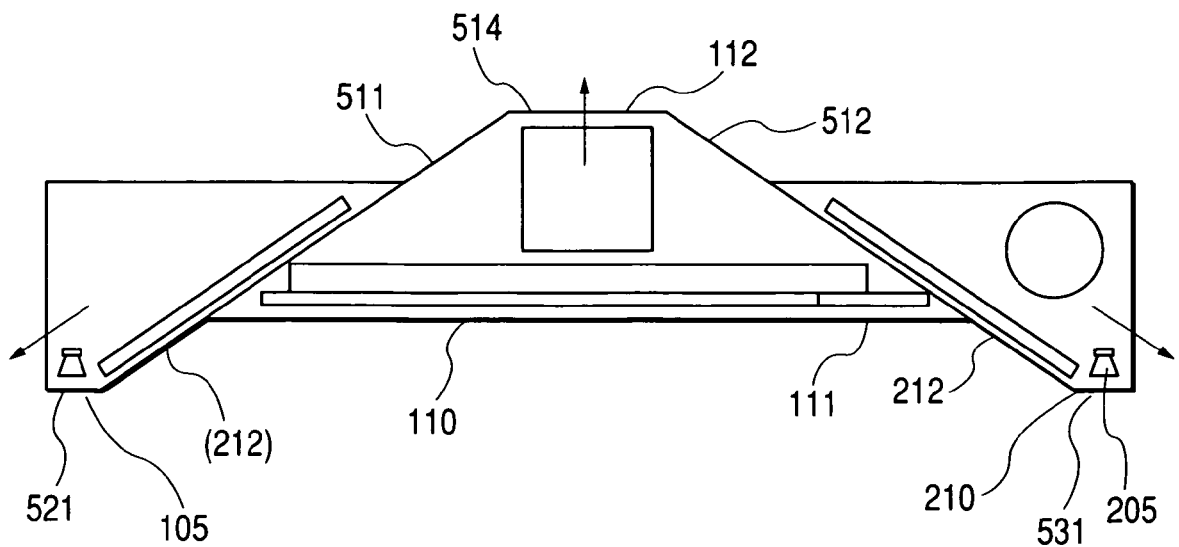

FIGS. 9A and 9B are external views showing the third embodiment of the portable information terminal (portable phone) according to the present invention. FIG. 9A is a top view in the first state, showing a part of the internal mechanism. FIG. 9B is a top view in the second state, showing a part of the internal mechanism. Here, the lower section on the sheet indicates a front side, and the upper section indicates a backside. In the present embodiment, the body 10 comprises three bodies, i.e., a first body 510 arranged at the center in the longitudinal direction (width direction W), a second body 520 and a third body 530 on the both sides of the first body. The two bodies 520, 530 on the both sides are slidably provided with respect to the first body 510.

In FIGS. 9A and 9B, the portable phone 3 relating to the third embodiment comprises the first body 510 being trapezoidal, wide on the front side and narrow on the rear side. On the both sides thereof, two bodies 520 and 530 are slidably mounted using the two inclined planes 511 and 512 of the trapezoid shape as slide surfaces. Then, as shown in FIG. 9A, in the first state, the phone has a box-like shape being thin in cross direction, which is landscape rectangular shape. When viewed from the top surface, the shape is long in the horizontal direction W. As shown in FIG. 9B, in the second state, the two bodies 520 and 530 on both sides are structured such that they slide toward obliquely front, via the slide surfaces as described above.

A feature of the third embodiment is that two narrow surfaces 521 and 531 of the two bodies 520 and 530 remain on the front both sides of first body 510. On the narrow-width surfaces 521 and 531, there are provided the first speaker section 105 and the second speaker section 205, respectively. The receiver section (not illustrated) is provided on the first speaker section 105, and the microphone section 210 is provided on the second speaker section 205.

On the other hand, on the wide-width surface 513 of the first body 510, the display section 110 and the function keys section 111 are arranged, and inside of this display section 110 and the function keys section 111, there are arranged a liquid crystal device 130 and an operation substrate 132, which are parallel with the wide-width surface 513. On the rear thereof, the first substrate 131 is arranged and further in the rear of the first substrate, a camera unit 134 is arranged. Then, on the narrow-width surface 514 on the backside of the first body 510, there is arranged a picture taking window 112.

In the meantime, as for the internal equipment of the second body 520 and the third body 530, a third substrate 522 and a fourth substrate 532 are respectively built therein along the inclined planes (slide surfaces) 511, 512, and on the two substrates, there are mounted the speaker unit 133, the speaker unit 234, and the microphone unit 235. Then, on the slide surfaces of the second body 520 and the third body 530, which are exposed in the second state as shown in FIG. 9B, the alphanumeric input keys section 212 is arranged in the block or in dispersed manner.

A shutter switch 213 and a mode changeover switch 214 are provided on the top surface of the third body 530, a manner mode setting key 215 is provided on the bottom surface of the second body 520, an external connection terminal cover 216 is provided on the bottom surface of the first body, and a charging terminal section 217 is provided on the side surface of the third body.

As thus described, in the present embodiment, in the first state as shown in FIG. 9A, it is possible to achieve an operational effect similar to that of the first embodiment. In the second state as shown in FIG. 9B, when the rear portion of the first body 510 is held so that the longitudinal direction (width direction W) is made vertical, the first speaker section 105 and the microphone section 210 can jut out towards the user side. Therefore, it is possible to obtain a posture for holding the phone similar to a general handset. On the other hand, in this second state, since the rear portion of the first body 510 jutting out towards back is caught in one's hand, by holding the backside of the third body 530, holding property can be enhanced. With such holding posture, picture taking by the camera unit can be performed favorably.

EXAMPLE 4

Figure 10A:
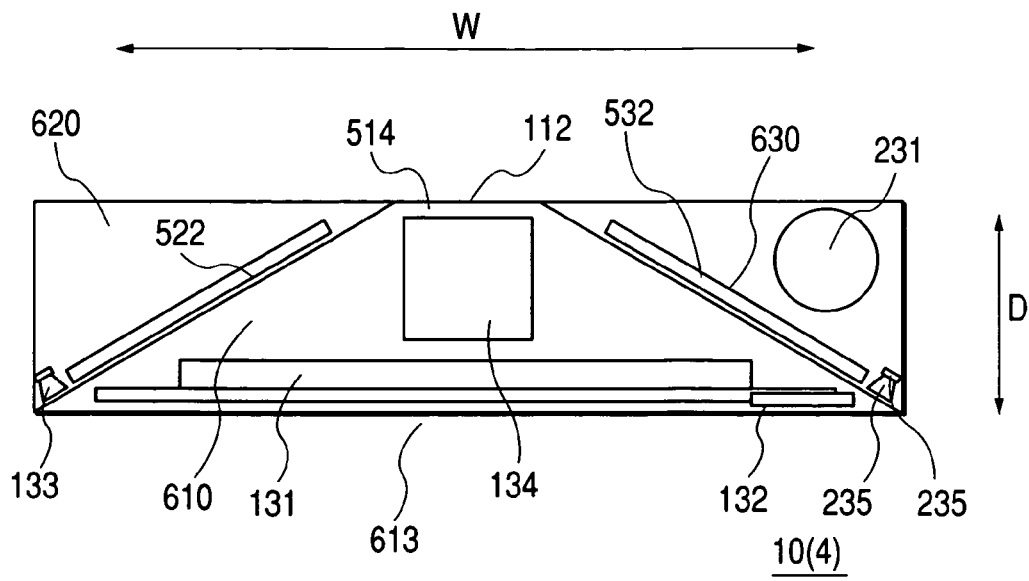
FIGS. 10A to 10C are external views of a portable information terminal (portable phone) of the fourth embodiment relating to the present invention.
Figure 10B:
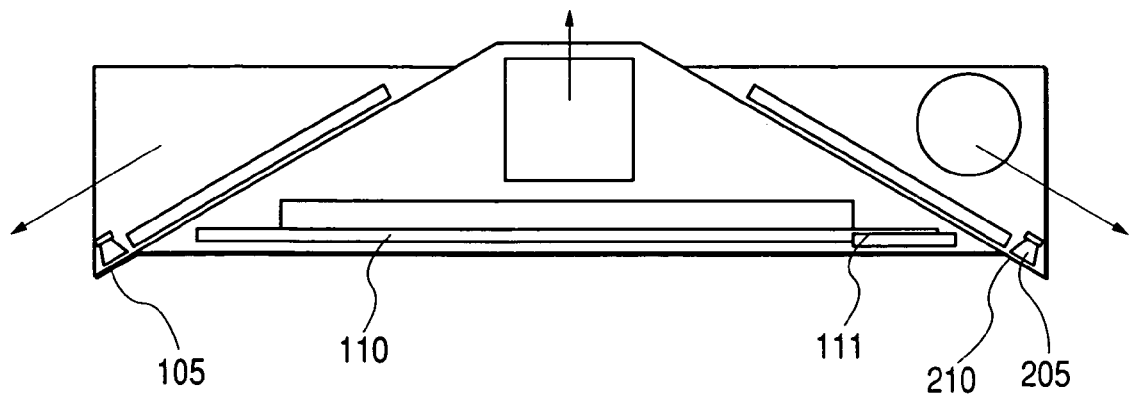
Figure 10C:
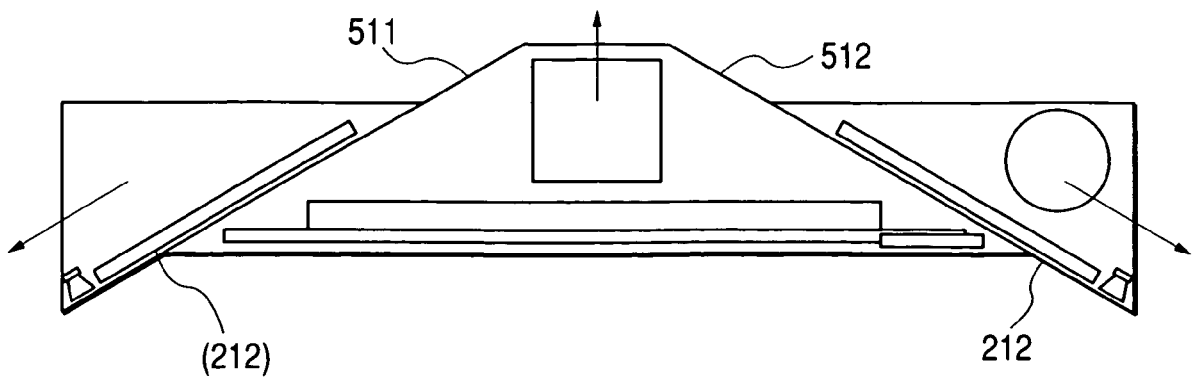

FIGS. 10A to 10C are external views showing the fourth embodiment of the portable information terminal (portable phone) according to the present invention. FIG. 10A is a top view in the first state showing a part of internal mechanism. FIG. 10B is a top view in the first stage of the second state showing a part of internal mechanism. FIG. 10C is a top view in the second stage of the second state showing a part of internal mechanism. Here, the lower section on the sheet represents a front side, and the upper section on the sheet represents a backside. In the present embodiment, similar to the third embodiment, the body 10 comprises three bodies, i.e., a first body 610 arranged in at the center of the longitudinal direction (width direction W), and two bodies 620, 630 on the both sides thereof. The two bodies 620, 630 on the both sides are slidably provided with respect to the first body 610. Here, it is to be noted that a point different from the third embodiment is the entire front side of the body 10 is configured by the wide surface 613 of the first body 610. In addition, the form of the body 10 is changed slidably in two stages as shown in FIG. 10B and FIG. 10C.

In the present embodiment, in the first state, the display section 110 and the function keys section 111 are arranged on the front surface (wide surface 613) of the body 10. Then, the first speaker section 105, the second speaker section 205, and the microphone section 210 are concealed. Therefore, in the first state, more compact shape can be obtained, which is specialized in picture taking by the camera unit or simple functions as a portable terminal.

Then, when TV programs and the like are watched, the portions, where the first speaker section 105 and the second speaker section 205 are arranged, are partially shifted in sliding manner. Accordingly, speakers are arranged on both sides of the display section 110 and ground-based digital broadcasting can be favorably enjoyed.

When it is used as a portable phone, as shown in FIG. 10C, two bodies are further allowed to move by sliding, and an operational effect similar to the third embodiment can be attained.

It is to be noted that with an internal changeover switch, not illustrated, it is possible to change the screen corresponding to the above three mode variations, i.e., a screen focusing on camera mode in the case of FIG. 10A, TV mode in the case of FIG. 10B, or phone mode in the case of FIG. 10C. In the above first embodiment, the part 104 and the part 204 of the counterpart's body respectively remain on the front side and the backside, but the part of the counterpart's body may remain only on either one of the backside and the front side.

In the above embodiments from the second to the fourth, for ease of explanation, the illustrations are drawn linearly, but similar to the first embodiment, it is preferable to carry out the invention with a rounded shape as illustrated in FIG. 2 to FIG. 4.

EXAMPLE 5

Figure 11A:
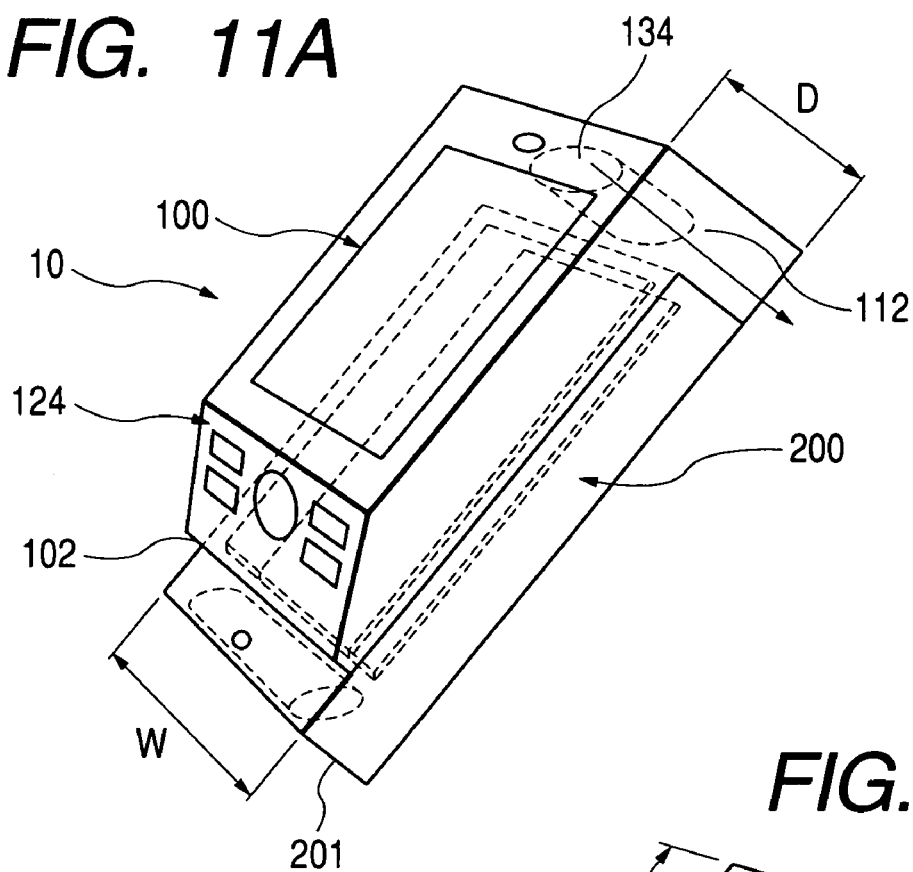
FIGS. 11A to 11B are external views of a portable information terminal (portable phone) of the fifth embodiment relating to the present invention.
Figure 11B:
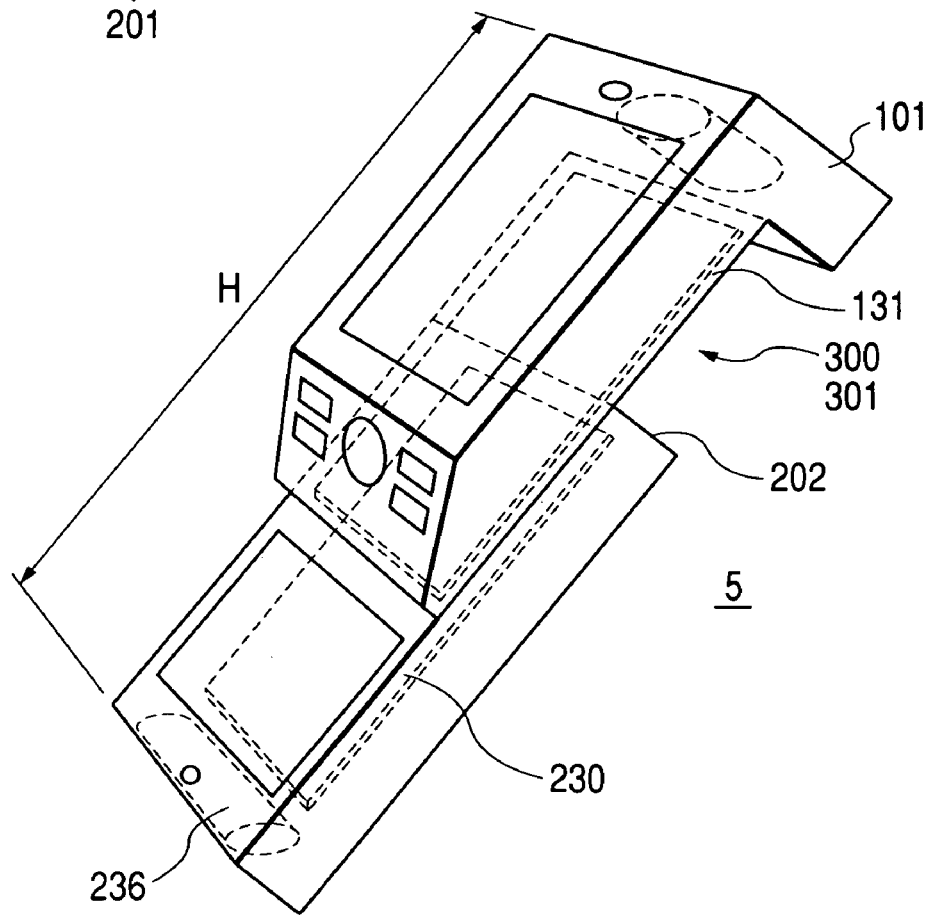

Next, with reference to FIG. 11A to FIG. 15C, a portable phone according to the fifth embodiment of the present invention will be explained. FIGS. 11A and 11B are conceptual diagrams of the portable phone, FIGS. 12A to 12D are external views of the portable phone in the first state, FIGS. 13A to 13C are external views of the portable phone in the second state, and FIG. 14 and FIGS. 15A to 15C are cross sectional views showing arrangement of the internal mechanism. Here, similar portions and directions as described in the above embodiments are represented by identical reference numerals, and duplicated explanations will be omitted.

Firstly, with reference to FIGS. 1A and 11B, a schematic structure of the present embodiment will be explained. FIGS. 11A and 11B show a schematic structure of the portable phone 5. The present embodiment is directed to a portable phone with a camera function having communication faculty as a main feature, and the longitudinal direction of the body 10 is assumed to be a vertical direction as a basic posture of the phone. However, the basic structure thereof is similar to that of the aforementioned first embodiment.

In other words, the portable phone generally represented by the reference numeral 5 comprises a first body 100, a second body 200 and a slide mechanism 300 which slidably couples the two bodies. In the present embodiment, the entire body 10 constituted by the two bodies has a vertically oriented, thin and flat rectangular parallelepiped shape, as a basic shape, in which the dimension in width direction W is larger than the dimension in depth direction D, and the dimension in height direction H is larger than the dimension in width direction W.

In the present embodiment, the second body 200 is arranged on the rear of the first body 100 in overlapping manner with behind/front positional relationship. The two bodies are arranged being displaced vertically, the upper end 101 of the first body 100 juts out upwardly from the upper end 202 of the second body 200, and the lower end 201 of the second body 200 juts out downwardly from the lower end 102 of the first body 100. Then, the part where the two bodies are overlapping is formed as a slide surface 301 having the aforementioned slide mechanism 300. The two bodies are allowed to slide mutually in the height direction H via this slide mechanism 300.

Therefore, in the present embodiment, as shown in FIG. 11A and FIG. 11B, in the first state where the two bodies are overlapped (shrunk), the phone has a compact form having a small height dimension H. On the other hand, in the second state where the two bodies are extended in the height direction H, it is possible to obtain a dimension (length) matching the distance between the ear and mouth of the user.

One of the features of the present embodiment is that a camera unit 134 and an antenna 236 are respectively provided on the portions, jutting out upward and downward, where the two bodies are not overlapped. With this configuration, as for the camera unit 134, since a picture taking window 112 is provided on the rear of the part 101 of the first body 100, jutting out upwardly, a picture can be taken without being obstructed by the second body 200. Furthermore, as for the antenna 236, since the first body 100 does not interfere with transmitting/receiving radio waves, it is possible to enhance efficiency in transmitting and receiving the radio waves.

In addition, in FIGS. 11A and 11B, the portable phone 5 is illustrated with simplified diagram for ease of explanation, but the portable phone 5 also includes two bodies of wedge-shape similar to the first embodiment, as shown in FIG. 12A to FIG. 15C where an actual form is illustrated. Therefore, even if the camera unit 134 and the antenna 236 are respectively arranged in the portions being thick in the depth direction D, jutting out upwardly and downwardly, it is possible to reduce the upsizing of the device. Accordingly, a similar operational effect as that of the first embodiment can be obtained.

One of the features of the present embodiment is that a lower end 102 of the first body 100, which is continuous with the part 201 jutting out downwardly of the second body 200, is defined as an inclined plane 124. With this configuration, in the first state, when the user holds the portable phone 5 with one hand, it is easy to take an action to push up the first body with pressing one's thumb onto the inclined plane 124. Therefore, a change from the first state to the second state can be performed just by one hand.

One of the features of the present embodiment is that as for the internal packaging arrangement, the substrates (a first substrate 131 and a second substrate 230) that are built in the first body 100 and the second body 200 respectively are provided in parallel with the slide surface 301. With this configuration, various switches mounted on each substrate are provided on the bumper sections 125, 224 (see FIG. 12) of the two bodies so that they surround the slide surface 301. Therefore, usability, property in design, and property in assembling can be enhanced.

Figure 12A:
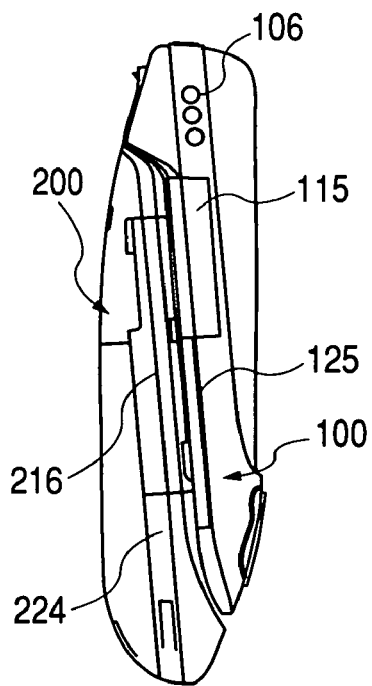
FIGS. 12A to 12D are external views of the portable information terminal (portable phone) of the fifth embodiment relating to the present invention.
Figure 12B:
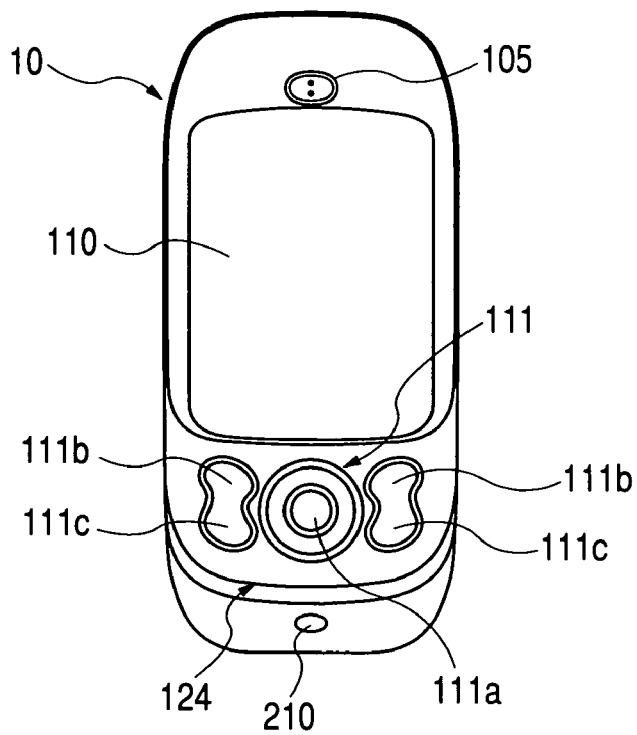
Figure 12C:
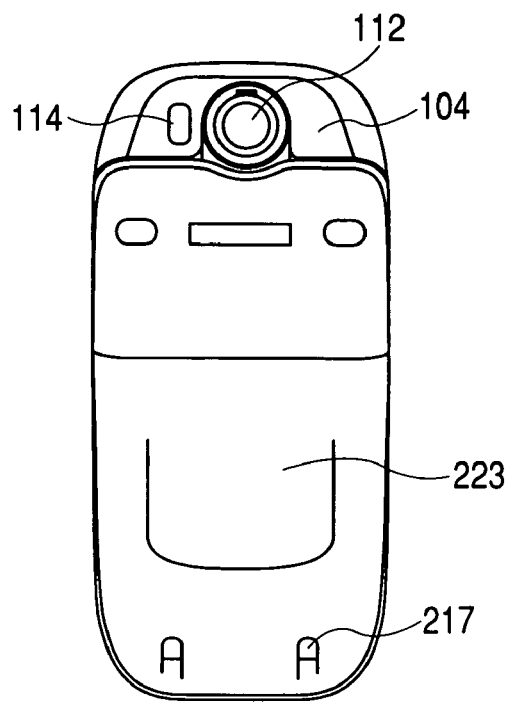
Figure 12D:
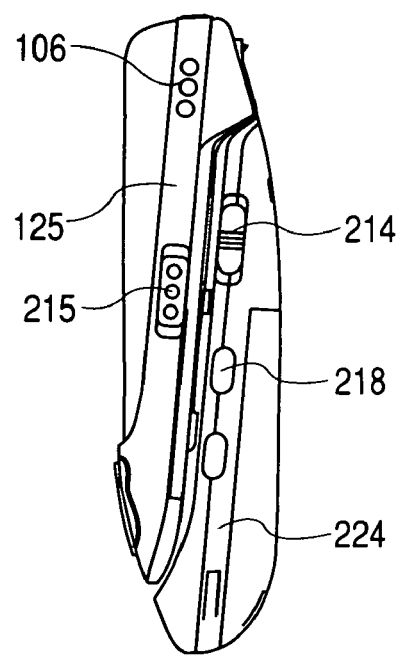
Figures 13A, 13B, 13C:
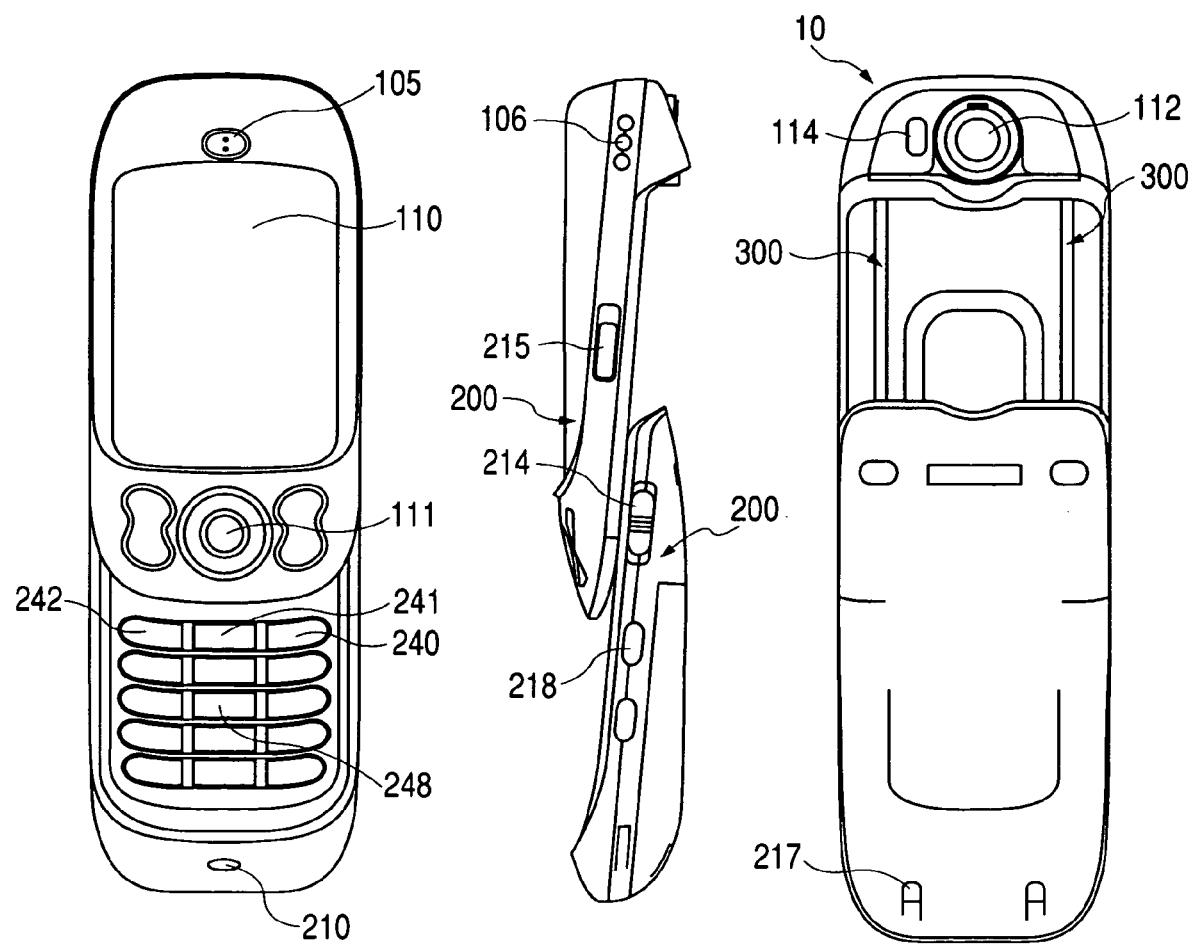
FIGS. 13A to 13C are external views of the portable information terminal (portable phone) of the fifth embodiment relating to the present invention.

With reference to FIGS. 12A to FIG. 15C, further explanations will be added. FIGS. 12A to 12D are external views of the portable phone in the first state. FIG. 12A is a left side view, FIG. 12B is a front view, FIG. 12C is a rear view, and FIG. 12D is a right side view. FIGS. 13A to 13C are external views of the portable phone in the second state. FIG. 13A is a front view, FIG. 13B is a right side view, and FIG. 13C is a rear view.

In FIGS. 12A to 12D, in the present embodiment, the body 10 in the first state also has a thin box-like shape, similar to an outer appearance of soap having four corners rounded, it is possible to obtain an operational effect similar to the first embodiment.

A display section 110 is arranged in the midsection of the wide surface (front surface) 103 of the first body 100, the first speaker section 105 is arranged on the upper side of the display section 110, and the function keys section 111 is arranged on the inclined plane 124 formed on the lower side of the display section 110. On the other hand, the part 104 of the first body, which is constantly exposed on the backside of the body 10, the picture taking window 112 and a flash 114 as a light for picture taking are arranged.

Furthermore, various switches are arranged on the bumper section 125 formed on the circumference of the first body 100. The bumper section 125 is formed so that it surrounds the display section 110, being continuous from the inclined plane 124 to the both side surfaces and the top surface of the body 1. Therefore, it is possible to distinguish the operation area separated from the display area. In the upper portions of the both side surfaces, there are arranged a pair of second speaker sections 106 for audio listening. On the left side surface, there is provided a memory card inserting section 115 under an openable and closable lid, and on the right side surface, there is provided a manner mode setting key 215. The function keys section 111 comprises a circular cursor decision key 111a arranged in the midsection, and a pair of selection keys 111b, 111c formed on the both sides of the cursor decision key.

As for the second body 200, there are provided a mode changeover switch 214 and a pair of setting keys 218 are provided on the bumper section 224 on the right side surface, and on the bumper section 224 on the left side surface, there is provided an external connection terminal cover 216 for covering the external connection terminal. In picture taking mode, a shutter key and a zoom key are allocated on the setting keys 218. Furthermore, on the part 204 of the second body 200 constantly exposed on one side of the wide surface (front surface) of the first body 100, a microphone section 210 is arranged.

In FIG. 13, also in the present embodiment, two bodies are extended along the height direction H via the slide mechanism 300 to render the phone in the second state, similar to the example as shown in FIG. 5. In this second state, since an alphanumeric keys 243, a calling key 242 and the like provided on the slide surface 301b of the second body 200 are exposed, it is possible to make a phone call or e-mail transmission and receiving via those keys.

Figure 14:
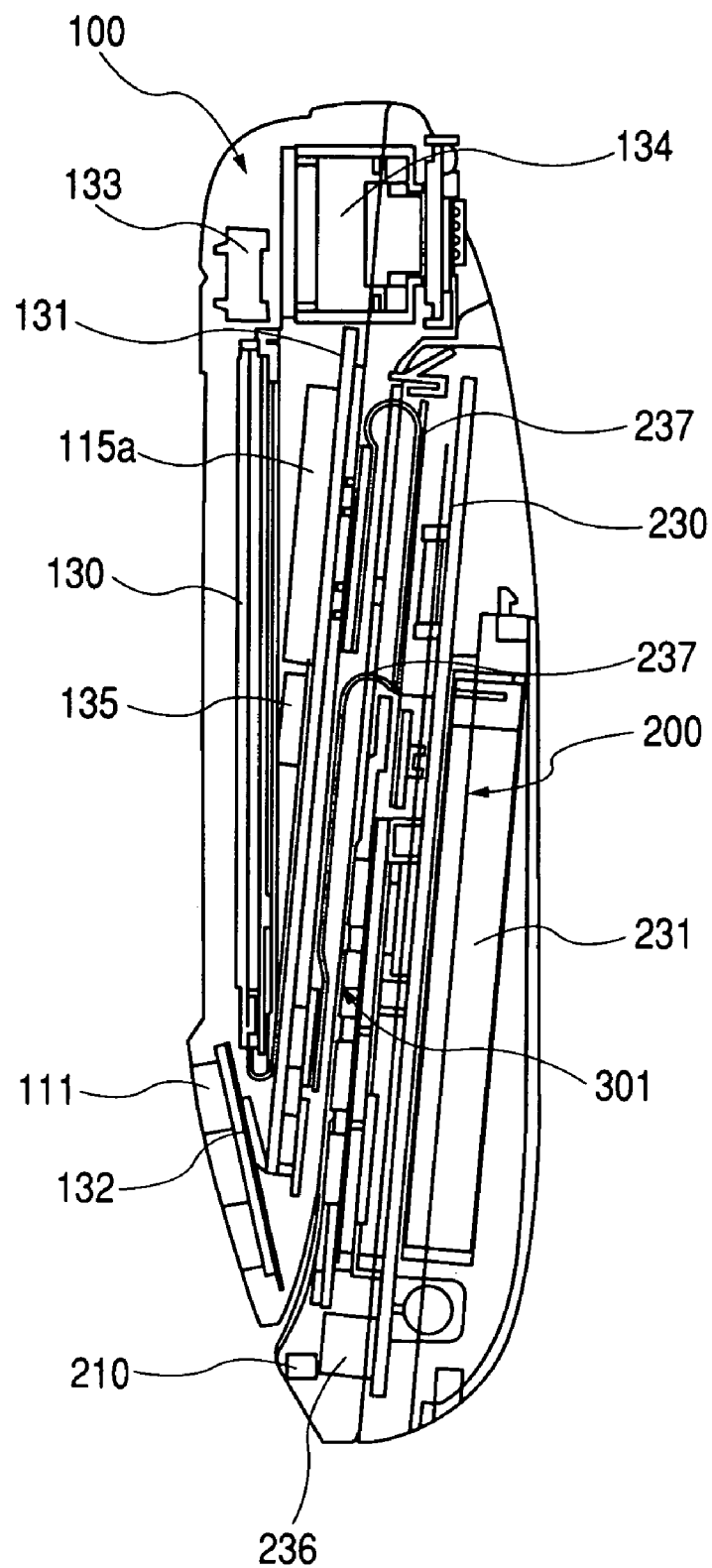
FIG. 14 is a cross sectional view of the portable information terminal (portable phone) of the fifth embodiment relating to the present invention.
Figure 15A:
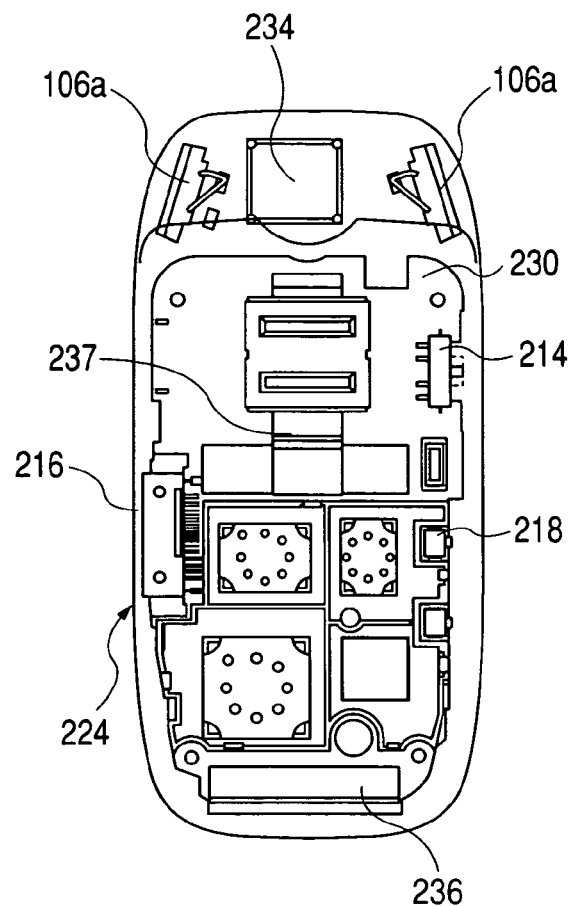
FIGS. 15A to 15C are cross sectional views of the portable information terminal (portable phone) of the fifth embodiment relating to the present invention.
Figure 15B:
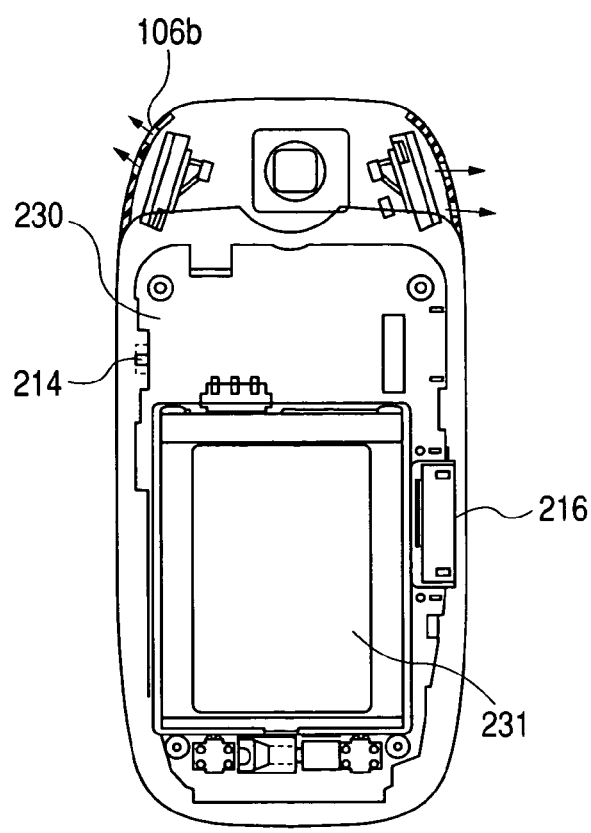
Figure 15C:
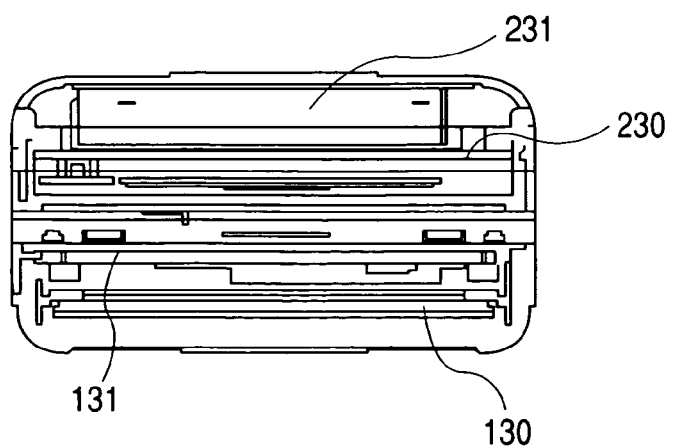

Next, with reference to FIGS. 15A to FIGS. 16E, an arrangement configuration of the internal packaging mechanism will be explained. FIG. 14 is a vertical cross sectional view of the portable phone. FIG. 15A is a cross sectional view of the second substrate 230 viewed from the slide surface 301 side, FIG. 15B is a cross sectional view of the second substrate 230 viewed from the backside, and FIG. 15C is a horizontal cross sectional view.

In those Figures, as described above, also in the present embodiment, the two bodies have wedge-shape similar to the first embodiment. Therefore, as shown in FIG. 14, since the first body 100 has an outer appearance that the upper portion is large in the depth direction D, the camera unit 134 can be arranged therein by use of this space. On the other hand, since the second body 200 has an outer appearance that the lower portion is large in the depth direction D, the battery section 231 and the antenna 236 can be arranged therein by use of this space.

In particular, since the antennal 236 is arranged so that the longitudinal direction thereof goes along the width direction W of the body and it is arranged on a portion always jutting outwardly in any of the first and second states, efficiency in transmitting and receiving radio waves can be enhanced.

In the meantime, a first substrate 131 and a second substrate 230 respectively as main substrates of the two bodies are arranged so that they are parallel with the slide surface 301. With this configuration, various switches provided on each substrate are mounted on the bumper sections of the first and the second bodies such that those switches surround the slide surface 301. Therefore, usability, property in design, and property in assembling of those switches can be enhanced.

Further in the present embodiment, a memory card 115a is stored by use of a space formed between the first substrate 131 and the liquid crystal device 130, and the memory card can be directly mounted on the first substrate 131.

Further in the present embodiment, since the two bodies are mutually moved along the slide surface 301, wire connection between the two substrates becomes easy if the two substrates are arranged in parallel. In other words, as shown in FIG. 14 and FIG. 15A, in the present embodiment, the two substrates are coupled via strip-shaped two wirings 237, having enough length, so as to prevent a breaking of wire, in both the second state where the phone is extended, and the first state where the phone is shrunk.

As shown in FIG. 15A and FIG. 15B, even when the mode changeover switch 214, setting key 218, and external connection terminal covered by the external connection terminal cover 216 are directly mounted on the substrate 230, these switches are arranged on the bumper section 224. Therefore, it is possible to enhance properties in assembling, design and handling.

On the both sides of the camera unit, there are arranged a pair of second speaker sections 106. In the present embodiment, a basic posture is to hold the longitudinal direction of the body 10 vertically, but as the first embodiment, it is possible to hold the longitudinal direction of the body 10 horizontally, so as to take a picture by the camera unit, video image viewing with the display section 110, and music listening with the second speaker sections 106. In the horizontal posture, the example as shown in FIG. 12B where the right side is set as upside is considered to be a basic posture. In this horizontal posture, the pair of the second speaker sections 106 are positioned vertical, and thus favorable stereo effect cannot be obtained. Therefore, as shown in FIG. 15B, in the present embodiment, sound-outputting holes 106b provided in front of the second speakers 106a are formed in a staggered configuration. For example, in FIG. 15B, the sound-outputting holes 106b on the left side are formed upwardly, and the sound-outputting holes 106b on the right side are formed downwardly. With this configuration it is possible to obtain a stereo effect.

EXAMPLE 6

Figure 16A:
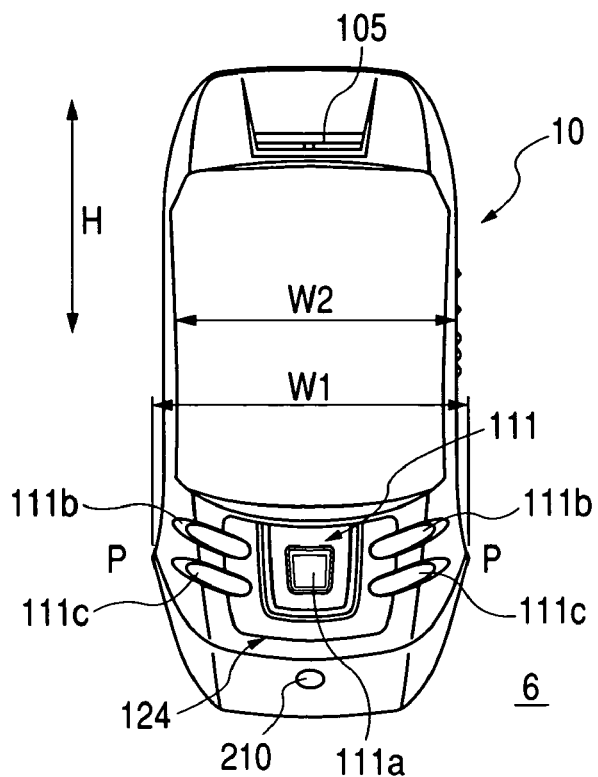
FIGS. 16A to 16E are external views of a portable information terminal (portable phone) of the sixth embodiment relating to the present invention.
Figure 16B:
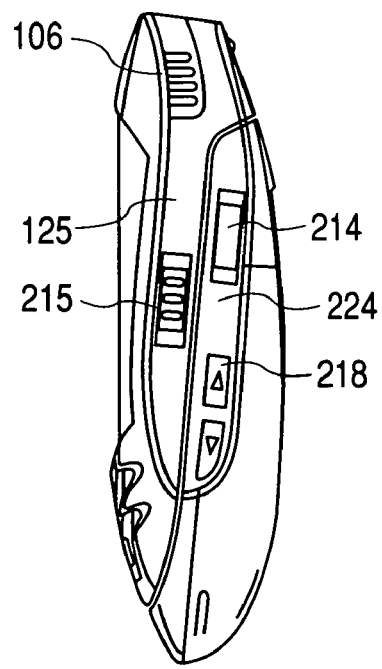
Figure 16C:
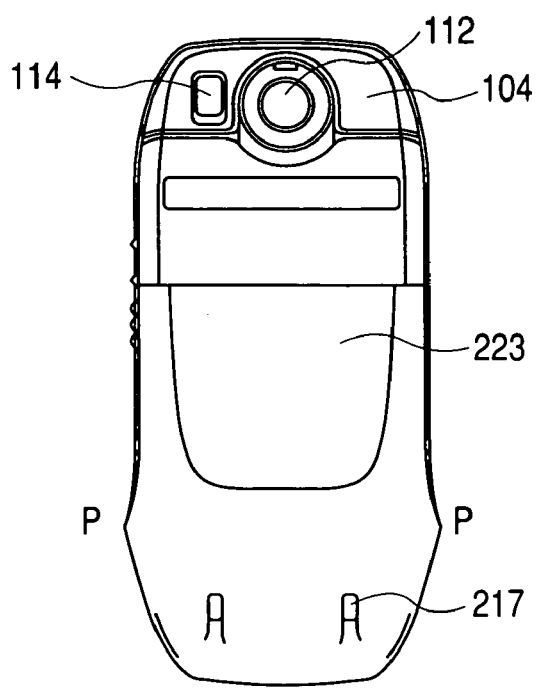
Figure 16D:
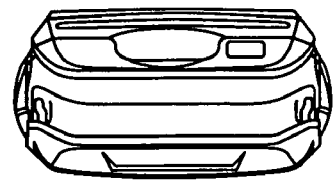
Figure 16E:
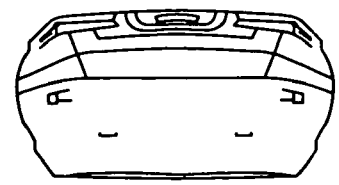

Next, with reference to FIG. 16A to FIG. 17C, a portable phone 6 relating to the sixth embodiment of the present invention will be explained. FIGS. 16A to 16E are external views in the first state of the portable phone. FIG. 16A is a front view, FIG. 16B is a right side view, FIG. 16C is a rear view, FIG. 16D is a top view, and FIG. 16E is bottom view. FIGS. 17A to 17C are external views in the second state, and FIG. 17A is a left side view, FIG. 17B is a front view, and FIG. 17C is a rear view. Here, similar portions and directions as described in the above embodiments are represented by identical reference numerals and duplicated explanations will be omitted.

In the present embodiment, similar to the fifth embodiment, the second body 200 is arranged on the rear of the first body 100 in overlapping manner with behind/front positional relationship, where the two bodies are arranged with a difference of H in the vertical direction. Therefore, it is possible to obtain an operational effect similar to that of the fifth embodiment.

Then, a distinctive feature of the present embodiment is that the width W1 in the width direction W of the portion constantly overlapped in the first state is made larger the other width W2. In other words, in the present embodiment, the width W1 in the lower section of the body 10 in the first state is made larger than the width W2 in the midsection of the body 10. In the present embodiment, as shown in FIG. 16A and FIG. 16C, both side surfaces of the inclined plane 124 provided with the function keys 111 are formed in such a manner as jutting out towards both sides, respectively. This shape is formed in such a manner that both sides around the midsections of the inclined plane 124 respectively jut out mountainously with the apex P. In the present embodiment, the shape is formed with negative radius from the apex P into upward direction of the body 10, and the shape is formed in swelling manner with positive radius from the apex P into downward direction of the body 10. Since the vicinity of the apex P is a portion constantly overlapped by the two bodies, both the two bodies have a shape jutting outwardly to the sides in the lower section.

According to the portable phone 6 with such a shape as described above, as shown in FIG. 17, when the state is changed to the second state where two bodies are extended, a portion having a narrow width (in the vicinity of P3) is configured between the jutting area at the both sides in the lower section of the first body 100 (in the vicinity of P1) and the jutting area at the both sides in the lower section of the second body 200 (in the vicinity of P2).

With this configuration, it is possible to hold the phone such that the user grasps the narrow width portion (in the vicinity of P3) between the above two jutting areas, at the base of thumb and other fingers. Accordingly, the portable phone 1 in the second state is held securely by one hand, with the two jutting-out areas vertically positioned, a risk of falling is reduced. Moreover, with such a holding posture, the function keys section 111 can be operated with the thumb, while securely holding the body 10.

In addition, even in the first state, since the phone can fit into the palm of hand with the jutting portions on the both sides (in the vicinity of P), it is also possible to reduce a risk of falling. Furthermore, in the first state, since the body 10 has a shape being sharp at the lower section, it is easy to put the phone into a pocket and the like.

What is claimed is:

1. A portable information terminal comprising:
   a body including a first body and a second body;
   a slide mechanism for coupling the first body and the second body to be slidable towards or away from each other in one direction;
   a camera unit for taking an image;
   an operation switch unit; and
   a display section that displays the image to be taken,
   wherein, the slide mechanism couples the first body and the second body so as to take a first state where the body is shortened in a width direction by sliding the first body towards the second body, or a second state where the body is extended in the width direction by sliding the first body away from the second body,
   the body in the first state has a thin and flat appearance that a dimension of the body in a height direction is larger than a dimension of the body in a depth direction and a dimension of the body in the width direction is larger than the dimension in the height direction, and
   the display section is arranged on a front surface of the first body facing away from the second body,
   the camera unit includes a picture taking window mounted on a backside surface of the first body and exposed from the second body in the first state,
   the operation switch unit includes a shutter switch, where is arranged on a side surface of the second body to operate the camera unit in the first state.

2. A portable information terminal according to claim 1, wherein,
   a first speaker section is arranged on the front surface of the first body and at a position opposed to the camera unit across the first body,
   a thick end part of the second body does not overlap with the first body in the first state and the second state, and
   a second speaker section is arranged at the thick end part of the second body.

3. The portable information terminal according to claim 2, wherein,
   the first body is provided with a display section and a function keys section, and
   the display section and the function keys section are arranged between the first speaker section and the second speaker section.

4. A portable information terminal according to claim 1, wherein, the first body has a thick end part and a thin end part, and the first body gradually becoming thinner from the thick end part to the thin end part,
   the second body has a thick end part and a thin end part, and the second body gradually becoming thinner from the thick end part to the thin end part,
   the thick end part of the first body does not overlap with the first body in the first state and the second state, and
   the picture taking window is mounted on at the thick end part of the first body.

5. A portable information terminal according to claim 1, wherein
   the picture taking window is exposed from the second body in both the first and second states, and
   the operation switch unit includes the shutter switch operates the camera unit in both the first and second states.

6. A portable information terminal comprising a body includes a first body and a second body, and a slide mechanism for coupling the first body and the second body slidably towards or away from each other, wherein,
   the body has a thin and flat appearance where a dimension of the body in a height direction is larger than a dimension of the body in a depth direction, as well as a dimension of the body in a width direction is larger than the dimension of the body in the height direction,
   an operation switch unit is arranged on a side surface along the width direction,
   the first body has a thick end part and a thin end part, and the first body gradually becomes thinner from the thick end part to the thin end part,
   the second body has a thick end part and a thin end part, and the second body gradually becomes thinner from the thick end part to the thin end part,
   a slide mechanism couples the first body and the second body so that the first and second bodies are entirely overlapped in a first state and the first and second bodies are away from each other in a second state where the body is extended in the width direction,
   the thick end part of the first body includes a surface not overlapped in the first state at the second body, and the surface of the first body not overlapped is arranged on the backside of the body,
   the thick end part of the second body includes a surface which does not overlap with the first body in the second state, and the thin end part of the second body is partially exposed from the first body at a cut-out portion thereof in the first state,
   the first body comprises a display section and a function keys section arranged on a front side of the first body facing away from the second body, a camera unit provided into said surface of the thick end part of the first body to expose from the second body at said cut-out portion in the first state, and a first speaker section provided on the front surface of the body at a position opposed to the camera unit across the first body, the second body comprises an alphanumeric input keys section arranged on a surface thereof facing the first body and a microphone section provided into the surface at the thick end part of the second body, the display section and the function keys section are arranged between the first speaker section and the microphone section in the first state, the alphanumeric input keys section is arranged between the first speaker section and the microphone section in the second state, and the operation switch unit includes a shutter switch for operating the camera unit in the first state and the second state.

7. A portable information terminal according to claim 6, wherein, the second body is provided with a battery which is detachably arranged on a surface of the second body facing away from the first body.

8. A portable information terminal according to claim 6, wherein, the operation switch unit includes a mode changeover switch capable of changing an operation mode of the body from a standby status mode to a picture-taking mode the shutter switch and the mode changeover switch are arranged along the longitudinal direction of the second body.

* * * * *